US012284644B2

(12) United States Patent
Dutta et al.

(10) Patent No.: US 12,284,644 B2
(45) Date of Patent: Apr. 22, 2025

(54) TECHNIQUES FOR SIDELINK RESOURCE INFORMATION FORWARDING

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 17/574,113

(22) Filed: Jan. 12, 2022

(65) Prior Publication Data

US 2022/0240278 A1 Jul. 28, 2022

Related U.S. Application Data

(60) Provisional application No. 63/140,753, filed on Jan. 22, 2021.

(51) Int. Cl.
*H04W 72/12* (2023.01)
*H04W 72/0446* (2023.01)
*H04W 72/0453* (2023.01)
*H04W 72/1263* (2023.01)
*H04W 72/20* (2023.01)
*H04W 72/52* (2023.01)

(52) U.S. Cl.
CPC ... *H04W 72/1263* (2013.01); *H04W 72/0446* (2013.01); *H04W 72/0453* (2013.01); *H04W 72/20* (2023.01); *H04W 72/52* (2023.01)

(58) Field of Classification Search
CPC . H04W 72/12; H04W 72/04; H04W 72/1263; H04W 72/0446; H04W 72/0453; H04W 72/20; H04W 72/52; H04W 28/0284; H04W 72/30; H04W 28/0289; H04W 28/26; H04W 72/02
USPC ........................................................ 370/329
See application file for complete search history.

(56) References Cited

U.S. PATENT DOCUMENTS

| | | | |
|---|---|---|---|
| 11,122,554 B2 * | 9/2021 | Ganesan | H04L 1/1854 |
| 11,297,618 B2 * | 4/2022 | Tang | H04W 76/14 |
| 11,570,797 B2 * | 1/2023 | Li | H04W 76/14 |

(Continued)

OTHER PUBLICATIONS

International Search Report and Written Opinion—PCT/US2022/012362—ISA/EPO—Apr. 29, 2022.

(Continued)

*Primary Examiner* — Man U Phan
(74) *Attorney, Agent, or Firm* — Holland & Hart LLP

(57) ABSTRACT

Methods, systems, and devices for wireless communications are described. A first user equipment (UE) may be configured to trigger a sidelink message to one or more UE of set of multiple other UEs. The first UE may then generate the sidelink message based at least in part on the triggering. In some cases, the sidelink message may include time and frequency resource information associated with sidelink control information received and processed by the first UE. The first UE may multiplex the sidelink message with a sidelink data message. The first UE may then transmit the sidelink message multiplexed with the sidelink data message to the one or more UE of the set of multiple other UEs.

30 Claims, 13 Drawing Sheets

(56) References Cited

U.S. PATENT DOCUMENTS

| | | | | |
|---|---|---|---|---|
| 11,711,807 | B2* | 7/2023 | Belleschi | H04W 76/14 |
| | | | | 370/329 |
| 11,871,418 | B2* | 1/2024 | Wang | H04W 72/20 |
| 2021/0022142 | A1* | 1/2021 | Wu | H04L 1/1896 |
| 2022/0029756 | A1* | 1/2022 | Sarkis | H04W 72/20 |
| 2022/0046628 | A1* | 2/2022 | Ji | H04L 1/1896 |
| 2022/0159696 | A1* | 5/2022 | Lu | H04W 72/543 |
| 2022/0225292 | A1* | 7/2022 | Mohammad Soleymani | |
| | | | | H04W 72/02 |
| 2022/0272727 | A1* | 8/2022 | Salim | H04L 5/0051 |
| 2023/0337237 | A1* | 10/2023 | Hassan | H04W 72/20 |
| 2023/0389046 | A1* | 11/2023 | Kim | H04W 4/90 |

OTHER PUBLICATIONS

LG Electronics: "Discussion on Feasibility and Benefits for Mode 2 Enhancement", 3GPP TSG RAN WG1 Meeting #1 03-e, 3GPP Draft, R1-2007896, 3rd Generation Partnership Project (3GPP), Mobile Competence Centre, 650, Route Des Lucioles, F-06921 Sophia-Antipolis Cedex, France, vol. RAN WG1, No. e-Meeting Oct. 26, 2020-Nov. 13, 2020, Oct. 24, 2020 (Oct. 24, 2020), 26 Pages, XP051946544, Retrieved from the Internet: URL: https://ftp.3gpp.org/tsg_ran/WG1_RL1/TSGR1_103-e/Docs/R1-2007896.zip, R1-2007896 Discussion on sidelink mode 2 enhancement.docx, [retrieved on Oct. 24, 2020], Sections 2.1, 2.2.

* cited by examiner

TECHNIQUES FOR SIDELINK RESOURCE INFORMATION FORWARDING

CROSS REFERENCE

The present Application for Patent claims the benefit of U.S. Provisional Patent Application No. 63/140,753 by DUTTA et al., entitled "TECHNIQUES FOR SIDELINK RESOURCE INFORMATION FORWARDING," filed Jan. 22, 2021, assigned to the assignee hereof, and expressly incorporated by reference herein.

FIELD OF TECHNOLOGY

The following relates to wireless communications, including techniques for sidelink resource information forwarding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support Mode 2 sidelink operation, in which UEs unilaterally (e.g., without instruction from a base station) "reserve" resources for sidelink transmissions. Improved techniques for UEs operating in sidelink operation, such as but not limited to Mode 2 sidelink operation is desirable.

SUMMARY

The described techniques relate to improved methods, systems, devices, and apparatuses that support techniques for sidelink resource information forwarding. Generally, the present disclosure provides techniques for transmitting resource information for sidelink communications which reduces sidelink conflicts while preventing significant increases in control signaling overhead. In particular, according to techniques described herein, UEs may be configured with one or more "reporting configurations" for transmitting (e.g., forwarding) time/frequency resource information for sidelink communications. For example, a first user equipment (UE) may receive and process sidelink control information (SCI) which acts to reserve sidelink resources for future communications by other UEs. The first UE may additionally identify a conflict between multiple sidelink communications which overlap in the time and/or frequency domain. Upon identifying the conflict, the first UE may transmit a sidelink message which includes time/frequency resource information based on SCIs that the UE received and processed prior to detection of the conflict. The forwarded time/frequency resource information may be the encoded SCIs themselves or may be the decoded data from the SCIs. By transmitting (e.g., forwarding) time/frequency resource information, reporting configurations described herein may serve to reduce or eliminate conflicts between sidelink communications without unduly increasing network congestion.

A method for wireless communication at a first UE is described. The method may include triggering a sidelink message to one or more UE of a set of multiple other UEs, generating the sidelink message based on the triggering, the sidelink message including time and frequency resource information associated with sidelink control information received and processed by the first UE, multiplexing the sidelink message with a sidelink data message, and transmitting the sidelink message multiplexed with the sidelink data message to the one or more UE of the set of multiple other UEs.

An apparatus for wireless communication at a first UE is described. The apparatus may include a processor, memory coupled with the processor, and instructions stored in the memory. The instructions may be executable by the processor to cause the apparatus to trigger a sidelink message to one or more UE of a set of multiple other UEs, generate the sidelink message based on the triggering, the sidelink message including time and frequency resource information associated with sidelink control information received and processed by the first UE, multiplex the sidelink message with a sidelink data message, and transmit the sidelink message multiplexed with the sidelink data message to the one or more UE of the set of multiple other UEs.

Another apparatus for wireless communication at a first UE is described. The apparatus may include means for triggering a sidelink message to one or more UE of a set of multiple other UEs, means for generating the sidelink message based on the triggering, the sidelink message including time and frequency resource information associated with sidelink control information received and processed by the first UE, means for multiplexing the sidelink message with a sidelink data message, and means for transmitting the sidelink message multiplexed with the sidelink data message to the one or more UE of the set of multiple other UEs.

A non-transitory computer-readable medium storing code for wireless communication at a first UE is described. The code may include instructions executable by a processor to trigger a sidelink message to one or more UE of a set of multiple other UEs, generate the sidelink message based on the triggering, the sidelink message including time and frequency resource information associated with sidelink control information received and processed by the first UE, multiplex the sidelink message with a sidelink data message, and transmit the sidelink message multiplexed with the sidelink data message to the one or more UE of the set of multiple other UEs.

In some examples of the method, apparatuses, and non-transitory computer-readable medium described herein, the triggering the sidelink message may include operations, features, means, or instructions for detecting a conflict arising from at least partial overlap of sidelink communications transmitted or scheduled to be transmitted by the set of multiple other UEs.

In some examples of the method, apparatuses, and non-transitory computer-readable medium described herein, detecting the conflict may include operations, features, means, or instructions for receiving at least two sidelink transmissions from the set of multiple other UEs on overlapping time and frequency resources.

In some examples of the method, apparatuses, and non-transitory computer-readable medium described herein, detecting the conflict may include operations, features, means, or instructions for receiving an indication that at least two sidelink transmissions from the set of multiple other UEs may be scheduled to overlap in time and frequency resources.

In some examples of the method, apparatuses, and non-transitory computer-readable medium described herein, detecting the conflict may include operations, features, means, or instructions for receiving at least two sidelink transmissions from the set of multiple other UEs at a same time.

In some examples of the method, apparatuses, and non-transitory computer-readable medium described herein, the sidelink message multiplexed with the sidelink data message may be transmitted in a first slot and the method, apparatuses, and non-transitory computer-readable medium may include further operations, features, means, or instructions for generating additional sidelink messages based on the triggering the sidelink message, the additional sidelink messages including updated time and frequency resource information associated with additional sidelink control information received and processed by the first UE after the triggering the sidelink message and transmitting the additional sidelink messages according to a periodicity for a quantity of slots.

In some examples of the method, apparatuses, and non-transitory computer-readable medium described herein, the periodicity may be every slot during the quantity of slots.

Some examples of the method, apparatuses, and non-transitory computer-readable medium described herein may further include operations, features, means, or instructions for receiving an indication of the quantity of slots, the periodicity, or both, where the first UE transmits the additional sidelink messages based on receiving the indication of the quantity of slots, the periodicity, or both.

Some examples of the method, apparatuses, and non-transitory computer-readable medium described herein may further include operations, features, means, or instructions for determining the quantity of slots, the periodicity, or both, based on network congestion, where the first UE transmits the additional sidelink messages based on determining the quantity of slots, the periodicity, or both.

In some examples of the method, apparatuses, and non-transitory computer-readable medium described herein, the time and frequency resource information included in the sidelink message may be based on the sidelink control information received and processed by the first UE prior to an end of a processing time interval.

Some examples of the method, apparatuses, and non-transitory computer-readable medium described herein may further include operations, features, means, or instructions for transmitting, via the sidelink message, an indication of the triggering the sidelink message.

Some examples of the method, apparatuses, and non-transitory computer-readable medium described herein may further include operations, features, means, or instructions for generating the sidelink message during a preparation time interval, where a start of the preparation time interval may be based on the triggering the sidelink message.

Some examples of the method, apparatuses, and non-transitory computer-readable medium described herein may further include operations, features, means, or instructions for receiving a reporting configuration for transmission of the sidelink message, where the sidelink message multiplexed with the sidelink data message may be transmitted in accordance with the reporting configuration.

In some examples of the method, apparatuses, and non-transitory computer-readable medium described herein, generating the sidelink message may include operations, features, means, or instructions for preparing the sidelink control information received and processed by the first UE for forwarding.

In some examples of the method, apparatuses, and non-transitory computer-readable medium described herein, the time and frequency resource information associated with the sidelink control information indicates a first set of sidelink resources which may be available for subsequent sidelink communications, a second set of sidelink resources which may be not available for subsequent sidelink communications, or both.

In some examples of the method, apparatuses, and non-transitory computer-readable medium described herein, the sidelink message multiplexed with the sidelink data message may be transmitted via a sidelink control channel, a sidelink shared channel, a sidelink feedback channel, or any combination thereof.

A method for wireless communication at a first UE is described. The method may include detecting a conflict arising from at least partial overlap of sidelink communications transmitted or scheduled to be transmitted by a set of multiple other UEs, generating a sidelink message based on the detected conflict, the sidelink message including time and frequency resource information associated with SCI received and processed by the first UE prior to detection of the conflict, and transmitting the sidelink message to one or more of the set of multiple other UEs.

An apparatus for wireless communication at a first UE is described. The apparatus may include a processor, memory coupled with the processor, and instructions stored in the memory. The instructions may be executable by the processor to cause the apparatus to detect a conflict arising from at least partial overlap of sidelink communications transmitted or scheduled to be transmitted by a set of multiple other UEs, generate a sidelink message based on the detected conflict, the sidelink message including time and frequency resource information associated with SCI received and processed by the first UE prior to detection of the conflict, and transmit the sidelink message to one or more of the set of multiple other UEs.

Another apparatus for wireless communication at a first UE is described. The apparatus may include means for detecting a conflict arising from at least partial overlap of sidelink communications transmitted or scheduled to be transmitted by a set of multiple other UEs, means for generating a sidelink message based on the detected conflict, the sidelink message including time and frequency resource information associated with SCI received and processed by the first UE prior to detection of the conflict, and means for transmitting the sidelink message to one or more of the set of multiple other UEs.

A non-transitory computer-readable medium storing code for wireless communication at a first UE is described. The code may include instructions executable by a processor to detect a conflict arising from at least partial overlap of sidelink communications transmitted or scheduled to be transmitted by a set of multiple other UEs, generate a sidelink message based on the detected conflict, the sidelink message including time and frequency resource information associated with SCI received and processed by the first UE prior to detection of the conflict, and transmit the sidelink message to one or more of the set of multiple other UEs.

In some examples of the method, apparatuses, and non-transitory computer-readable medium described herein, the sidelink message may be transmitted in a first slot and the method, apparatuses, and non-transitory computer-readable medium may include further operations, features, means, or instructions for generating additional sidelink messages based on the detected conflict, the additional sidelink messages including updated time and frequency resource information associated with additional SCI received and processed by the first UE after detection of the conflict and transmitting the additional sidelink messages according to a periodicity for a quantity of slots.

In some examples of the method, apparatuses, and non-transitory computer-readable medium described herein, the periodicity may be every slot during the quantity of slots.

Some examples of the method, apparatuses, and non-transitory computer-readable medium described herein may further include operations, features, means, or instructions for receiving an indication of the quantity of slots, the periodicity, or both, where the first UE transmits the additional sidelink messages based on receiving the indication of the quantity of slots, the periodicity, or both.

Some examples of the method, apparatuses, and non-transitory computer-readable medium described herein may further include operations, features, means, or instructions for determining the quantity of slots, the periodicity, or both, based on network congestion, where the first UE transmits the additional sidelink messages based on determining the quantity of slots, the periodicity, or both.

In some examples of the method, apparatuses, and non-transitory computer-readable medium described herein, the time and frequency resource information included in the sidelink message may be based on the additional SCI received and processed by the first UE prior to an end of a processing time interval.

Some examples of the method, apparatuses, and non-transitory computer-readable medium described herein may further include operations, features, means, or instructions for transmitting, via the sidelink message, an indication of the detected conflict.

Some examples of the method, apparatuses, and non-transitory computer-readable medium described herein may further include operations, features, means, or instructions for generating the sidelink message during a preparation time interval, where a start of the preparation time interval may be based on detection of the conflict.

In some examples of the method, apparatuses, and non-transitory computer-readable medium described herein, detecting the conflict may include operations, features, means, or instructions for receiving at least two sidelink transmissions from the set of multiple other UEs on overlapping time and frequency resources.

In some examples of the method, apparatuses, and non-transitory computer-readable medium described herein, detecting the conflict may include operations, features, means, or instructions for receiving an indication that at least two sidelink transmissions from the set of multiple other UEs may be scheduled to overlap in time and frequency resources.

In some examples of the method, apparatuses, and non-transitory computer-readable medium described herein, detecting the conflict may include operations, features, means, or instructions for receiving at least two sidelink transmissions from the set of multiple other UEs at the same time.

Some examples of the method, apparatuses, and non-transitory computer-readable medium described herein may further include operations, features, means, or instructions for receiving a reporting configuration for transmission of the sidelink message, where the sidelink message may be transmitted in accordance with the reporting configuration.

In some examples of the method, apparatuses, and non-transitory computer-readable medium described herein, generating the sidelink message, transmitting the sidelink message, or both may include operations, features, means, or instructions for forwarding the SCI received and processed by the first UE.

In some examples of the method, apparatuses, and non-transitory computer-readable medium described herein, the time and frequency resource information associated with the SCI indicates a first set of sidelink resources which may be available for subsequent sidelink communications, a second set of sidelink resources which may be not available for subsequent sidelink communications, or both.

In some examples of the method, apparatuses, and non-transitory computer-readable medium described herein, generating the sidelink message may include operations, features, means, or instructions for multiplexing the time and frequency resource information with a sidelink data message, where transmitting the sidelink message may be based on the multiplexing.

In some examples of the method, apparatuses, and non-transitory computer-readable medium described herein, the sidelink message may be transmitted via a sidelink control channel, a sidelink shared channel, a sidelink feedback channel, or any combination thereof.

DETAILED DESCRIPTION

Figure 1:
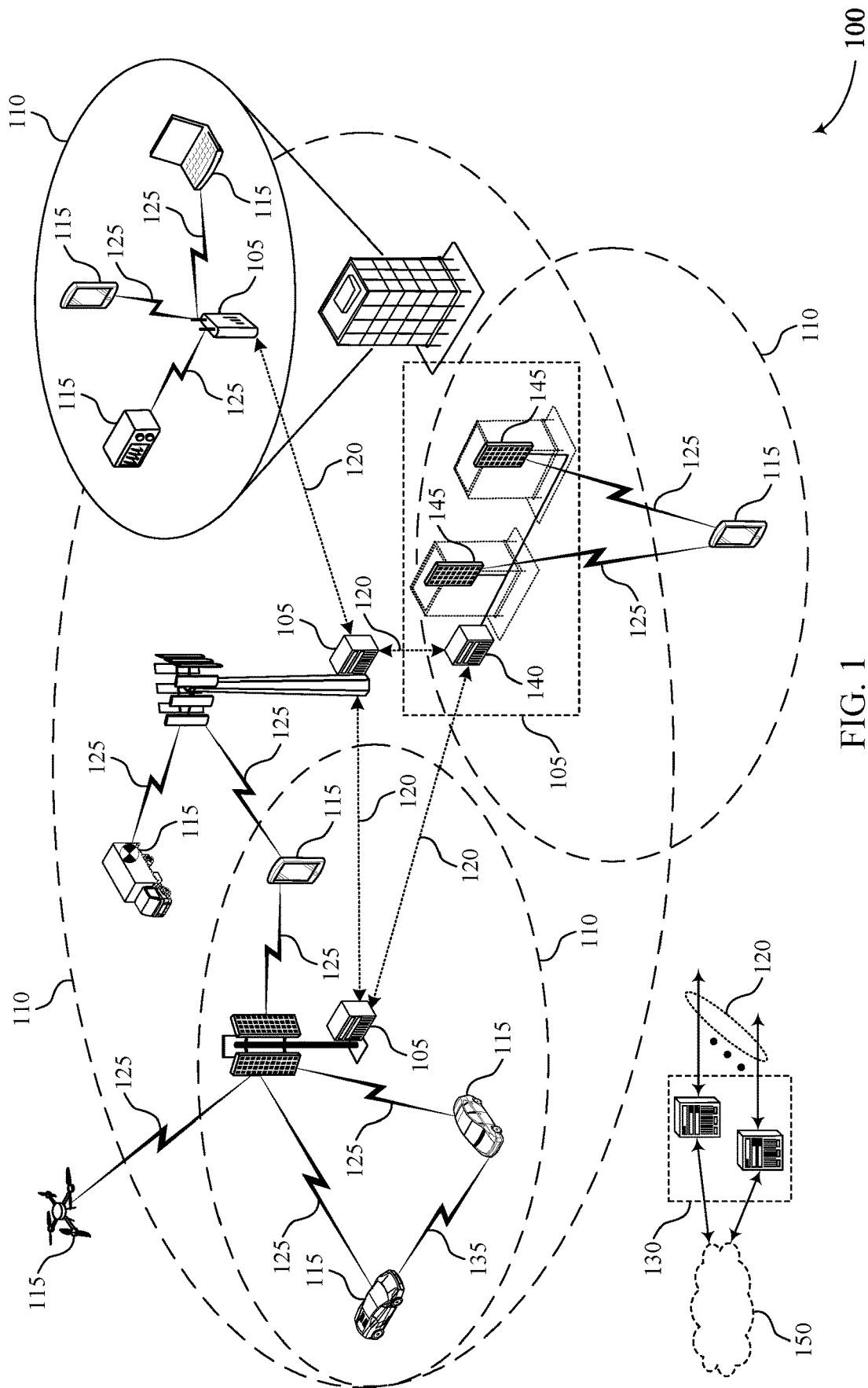
FIG. 1 illustrates an example of a wireless communications system that supports techniques for sidelink resource information forwarding in accordance with aspects of the present disclosure.

Some wireless communications systems may support Mode 2 sidelink operation, in which UEs unilaterally (e.g., without instruction from a base station) "reserve" resources for sidelink transmissions based on UE sensing (e.g., monitoring) of a transmission medium of the sidelink network. In Mode 2 sidelink operation, conflicts may arise when UEs are unable to communicate with each other. For example, while a first UE may be able to communicate with a both a second and a third UE, the second UE and the third UE may not be able to communicate with each other due to an obstruction or distance between the two. As a result, the second UE and the third UE could potentially both reserve the same sidelink resources for respective sidelink transmissions, resulting in a conflict that could be observed by the first UE.

In order to mitigate the effect of sidelink conflicts between UEs that are not in communication with each other, an observing UE (such as the first UE) may identify that conflicts are occurring and may indicate the observance of a conflict to neighboring UEs or the UEs involved in the conflict. However, such indications may only be intended to trigger retransmission of the conflicted signals. A wireless communications system may enable UEs to transmit (e.g., forward, relay) additional sidelink resource information to neighboring UEs in order to improve sidelink network coordination and reduce conflicts. However, frequently forwarding large quantities of sidelink resource information may significantly increase signaling overhead and congestion within a wireless communications system, thereby detrimentally affecting the efficiency and reliability of wireless communications.

Accordingly, aspects of the present disclosure may provide techniques for transmitting resource information for sidelink communications which reduces sidelink conflicts while preventing significant increases in signaling overhead. In particular, according to techniques described herein, UEs may be configured with one or more "reporting configurations" for transmitting (e.g., forwarding) time/frequency resource information for sidelink communications to improve sidelink network coordination and reduce network congestion.

For example, a first UE may receive and process sidelink control information (SCI) which acts to reserve sidelink resources for future communications by other UEs. The first UE may additionally identify a conflict between multiple sidelink communications which overlap in the time and/or frequency domain. The conflict may be identified based on actual receipt of the multiple overlapping sidelink communications, or by identifying conflicting reservations of overlapping sidelink resources. Upon identifying the conflict, the first UE may transmit a sidelink message which includes time/frequency resource information based on SCIs that the first UE received and processed prior to detection of the conflict. The forwarded time/frequency resource information may include the encoded SCIs themselves, the decoded data from the SCIs, or both. The time/frequency resource information may include resources which are or are not available for subsequent sidelink communications.

In some aspects, the first UE may transmit sidelink messages for time/frequency resource information according to one or more reporting configurations. For example, in accordance with a first reporting configuration, the first UE may transmit a single sidelink message with sidelink time/frequency resource information upon detecting a conflict. According to other reporting configurations, the first UE may transmit a sidelink message with sidelink time/frequency resource information within every slot for a predetermined quantity of slots, based on a periodicity (e.g., within every n slots) for a predetermined quantity of slots, or both.

Aspects of the disclosure are initially described in the context of wireless communications systems. Additional aspects of the disclosure are described in the context of example resource configurations and an example, process flow. Aspects of the disclosure are further illustrated by and described with reference to apparatus diagrams, system diagrams, and flowcharts that relate to techniques for sidelink resource information forwarding.

FIG. 1 illustrates an example of a wireless communications system 100 that supports techniques for sidelink resource information forwarding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to provide for the transmission of resource information for sidelink communications which reduces sidelink conflicts while preventing significant increases in signaling overhead. According to techniques described herein, UEs 115 of the wireless communications system 100 may be configured with one or more "reporting configurations" for transmitting (e.g., forwarding) time/frequency resource information for sidelink communications to improve sidelink network coordination and reduce network congestion.

For example, a first UE 115 of the wireless communications system may receive and process SCI which acts to reserve sidelink resources for future communications by other UEs 115. The first UE 115 may additionally identify a conflict between multiple sidelink communications which overlap in the time and/or frequency domain. The conflict may be identified based on actual receipt of the multiple overlapping sidelink communications, or by identifying conflicting reservations of overlapping sidelink resources. Upon identifying the conflict, the first UE 115 may transmit a sidelink message which includes time/frequency resource information based on SCIs that the first UE 115 received and processed prior to detection of the conflict. The forwarded time/frequency resource information may include the encoded SCIs themselves, the decoded data from the SCIs, or both. The time/frequency resource information may include resources which are or are not available for subsequent sidelink communications.

In some aspects, the first UE 115 may transmit (e.g., forward) sidelink messages for time/frequency resource information according to one or more reporting configurations. For example, in accordance with a first reporting configuration, the first UE 115 may transmit a single sidelink message with sidelink time/frequency resource information upon detecting a conflict. According to other reporting configurations, the first UE 115 may transmit a sidelink message with sidelink time/frequency resource information within every slot for a predetermined quantity of slots, based on a periodicity (e.g., within every n slots) for a predetermined quantity of slots, or both.

Techniques described herein may improve sidelink network coordination to reduce sidelink conflicts while preventing significant increases in signaling overhead. In some aspects, techniques described herein may enable UEs 115 to transmit (e.g., forward, relay) sidelink time/frequency resource information according to one or more reporting configurations upon identifying a conflict in sidelink communications. By transmitting time/frequency resource information in accordance with reporting configurations, techniques described herein may reduce or eliminate sidelink conflicts during Mode 2 sidelink operation, for example, thereby improving an efficiency and reliability of sidelink communications.

Figure 2:
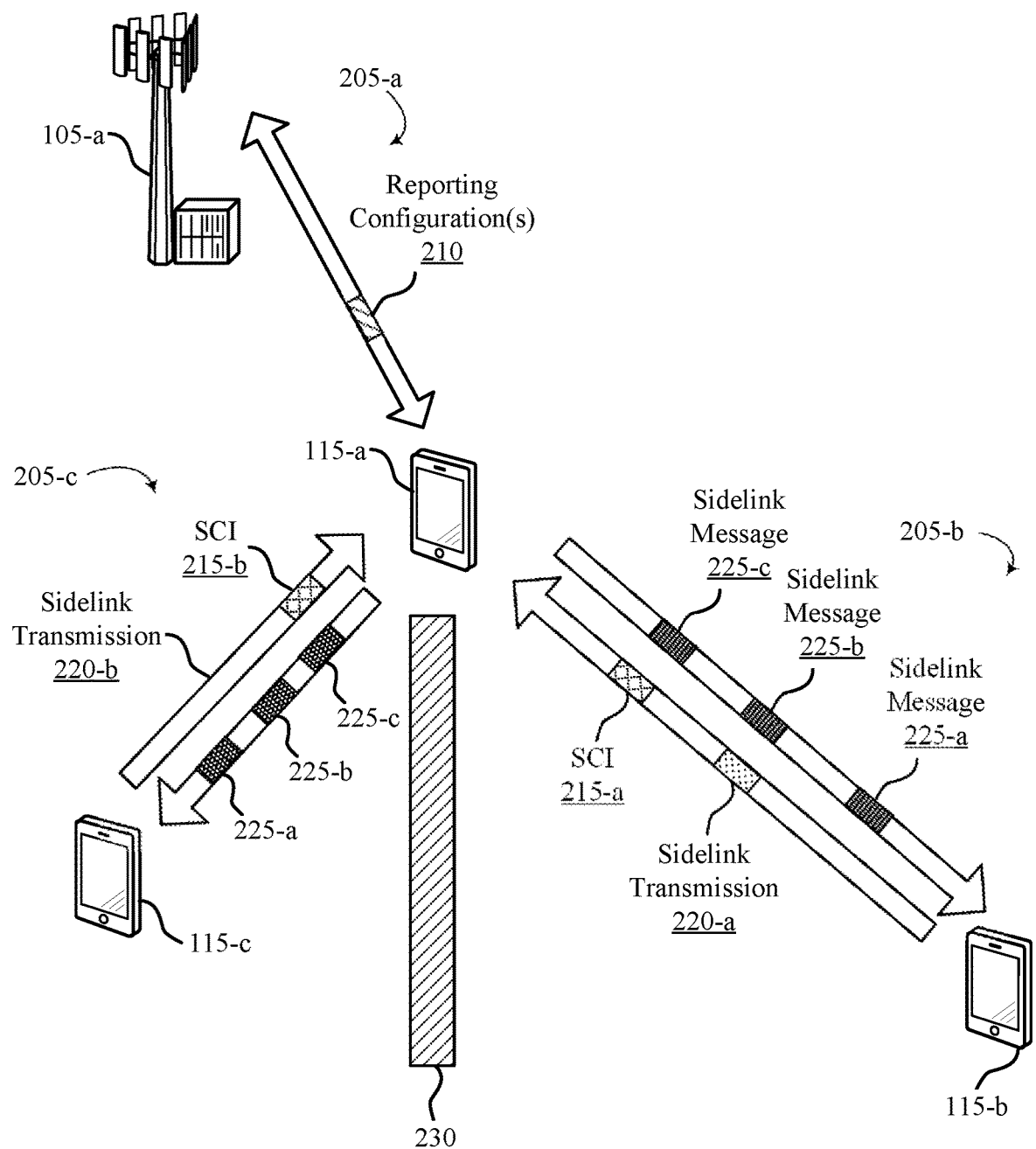
FIG. 2 illustrates an example of a wireless communications system that supports techniques for sidelink resource information forwarding in accordance with aspects of the present disclosure.

FIG. 2 illustrates an example of a wireless communications system 200 that supports techniques for sidelink resource information forwarding in accordance with aspects of the present disclosure. In some examples, wireless communications system 200 may implement aspects of wireless communications system 100. Wireless communications system 200 may support techniques for forwarding time and frequency resource information for sidelink communications.

The wireless communications system 200 may include a base station 105-a, first UE 115-a, a second UE 115-b, and a third UE 115-c, which may be examples of UEs 115, base stations 105, and other wireless devices as described with reference to FIG. 1. In some aspects, one or more of the UEs 115 may communicate with the base station 105-a using a communication link 205 (e.g., communication link 205-a), which may be an example of an NR or LTE link between the base station 105-a and the respective UE 115. In some aspects, communication links 205 between the base station 105-a and the respective UEs 115 (e.g., communication link 205-a) may include examples of access links (e.g., Uu links) which may include bi-directional links that enable both uplink and downlink communication. For example, the first UE 115-a may transmit uplink signals, such as uplink control signals or uplink data signals, to the base station 105-a using the communication link 205-a and the base station 105-a may transmit downlink signals, such as downlink control signals or downlink data signals, to the first UE 115-a using the communication link 205-a.

In some aspects, the first UE 115-a, the second UE 115-b, and the third UE 115-c may communicate with one another using communication links 205-b and 205-c, which may be examples of sidelink communication links or PC5 links. For example, the first UE 115-a may communicate with the second UE 115-b and the third UE 115-c via communication links 205-b and 205-c, respectively. In some cases, wireless communications between wireless devices (e.g., UEs 115 and base station 105-a) of the wireless communications system 200 may be blocked, or otherwise interrupted, by obstructions 230, noise, weather conditions, and the like. For example, an obstruction 230 may block, or otherwise interrupt, direct wireless communications between the second UE 115-b and the third UE 115-c.

In some aspects, the communication links 205-b and 205-c between the respective UEs 115 (e.g., sidelink communication links) may be included within a sidelink network of the wireless communications system 200. The sidelink network (e.g., sidelink network including the communication links 205-b, 205-c) may be configured to operate in "Mode 1," "Mode 2," or other sidelink modes where resources are shared between UEs. While operating in Mode 1, the sidelink network (e.g., communication links 205-b, 205-c) may be managed (e.g., coordinated) by the base station 105-a. In this regard, during Mode 1 operation, the base station 105-a may manage resource allocation over the communication links 205-b, 205-c, and may allocate sets of resources within the communication links 205-b, 205-c to the respective UEs 115-a, 115-b, and 115-c via the communication link 205-a and/or other communication links 205 between the base station 105-a and the respective UEs 115. In some cases, the base station 105-a may allocate sets of sidelink resources to the respective UEs 115 during Mode 1 operation via RRC signaling, downlink control information (DCI) messages (e.g., DCI 3_0), or both. During Mode 1 operation, the base station 105-a may allocate sidelink resources via dynamic grants, configured grants (e.g., type 1 configured grants, type 2 configured grants), or both. Within Mode 1 operation, a modulation and coding scheme (MCS) used for communications over the communication links 205-b, 205-c (e.g., sidelink communication links 205-b, 205-c) may be left up to the respective UEs 115, within limits which are pre-configured at the UEs 115 and/or signaled by the base station 105-a.

Comparatively, while operating in Mode 2, the sidelink network (e.g., communication links 205-b, 205-c) may not be managed (e.g., may not be coordinated) by the base station 105-a. Without coordination or management of the resources of the sidelink network during the Mode 2 operation, the UEs 115 may be configured to monitor the sidelink network (e.g., monitor sidelink communication links 205-b, 205-c), and determine sets of sidelink resources which are available for transmission of sidelink messages via the sidelink communication links 205-b, 205-c. For example, the first UE 115-a may "autonomously" determine sidelink resources which are to be used within the communication links 205-b, 205-c by monitoring the communication links 205-b, 205-c (e.g., perform channel sensing), and blindly decoding all physical sidelink shared channels (PSSCHs) within the communication links 205-b, 205-c to identify sidelink resources which have been reserved by other UEs 115 (e.g., second UE 115-b, third UE 115-c). Subsequently, the first UE 115-a may report available sidelink resources to the upper layer, and may transmit a sidelink communication (e.g., SCI) which reserves a set of sidelink resources for a sidelink communication to be performed (e.g., transmitted, received) at the first UE 115-a. In this regard, Mode 2 operation of the sidelink network including the communication links 205-b, 205-c may follow contention-based access procedures in which the various UEs 115 to "compete" for the use of the sidelink network, including the communication links 205-b, 205-c.

In the context of Mode 2 sidelink operation, conflicts may arise when UEs 115 are unable to communicate with each other and continue to unilaterally reserve sets of sidelink resources for sidelink communications. For example, as shown in FIG. 2, the obstruction 230 may block, or otherwise interrupt, direct wireless communications between the second UE 115-b and the third UE 115-c. In this example, the second UE 115-b may transmit an SCI which reserves a first set of sidelink resources for a first sidelink communication at the second UE 115-b. Subsequently, because the third UE 115-c was unable to receive the SCI from the second UE 115-b, the third UE 115-c may transmit an additional SCI which reserves a second set of sidelink resources for a second sidelink communication at the third UE 115-c, where the second set of sidelink resources overlaps with (e.g., conflicts with) the first set of sidelink resources in the time and frequency domain.

Continuing with the same example, the second UE 115-b and the third UE 115-c may transmit the first and second sidelink communications, respectively. Due to the fact that the first and second sidelink communications conflict with one another (e.g., collide with one another), the first UE 115-a may be unable to receive and/or decode the respective sidelink communications. In such cases, upon receiving conflicting (e.g., colliding) sidelink transmissions, the first UE 115-a may transmit a sidelink message to the second UE 115-b and the third UE 115-c, where the sidelink message includes a conflict indicator (e.g., post-collision indicator, half-duplex indicator) indicative of the conflict. The sidelink message may include SCI-1 and/or SCI-2 transmitted via a physical sidelink control channel (PSCCH), a PSSCH, indicated via sequences or preambles transmitted over a physical sidelink feedback channel (PSFCH), or any combination thereof. In this example, the sidelink message may trigger a retransmission of the respective sidelink communications. However, according to some wireless communications systems, the sidelink message triggering the retransmission may not indicate which sidelink resources the respective UEs 115-b, 115-c should use (or refrain from using) to perform the retransmissions.

Some wireless communications systems may attempt to reduce or eliminate conflicts (e.g., collisions) of sidelink communications by enabling UEs 115 to "forward" reservations of sidelink resources (e.g., forward SCI which reserves sidelink resources) used to other UEs 115. For example, upon receiving the first SCI from the second UE 115-b which reserves the first set of sidelink resources, the first UE 115-a may relay, or forward, an indication of the first set of sidelink resources to the third UE 115-c so that the third UE 115-c does not attempt to claim the same set of sidelink resources. In this regard, the UE 115-a may relay indications of preferred sidelink resources (e.g., available sidelink resources) and/or non-preferred sidelink resources (e.g., non-available sidelink resources) between the second UE 115-b and the third UE 115-c (and/or other UEs 115) in order to reduce and/or prevent sidelink conflicts, and to improve sidelink resource selection during Mode 2 sidelink operation.

Sidelink time/frequency resource information may be transmitted (e.g., forwarded, relayed) separately (e.g., via standalone SCI), in conjunction with other sidelink data transmissions (e.g., multiplexed or piggybacked with a PSSCH transmission), or both. Forwarding sidelink resource information via standalone SCI transmissions may reduce a latency at which sidelink resource information is transmitted/forwarded, thereby reducing the likelihood that forwarded sidelink resource information is "stale" by the time it is received by other UEs 115 and enabling the other UEs 115 sufficient time to receive/process the forwarded information. However, the standalone transmission/forwarding of sidelink resource information may increase network congestion. Comparatively, multiplexing (e.g., piggybacking) sidelink resource information with other sidelink transmissions may reduce network congestion. However, multiplexing sidelink resource information with other sidelink transmissions may increase latency, as other sidelink transmissions may be transmitted only periodically or aperiodically (as opposed to dynamically). Processing delays associated with preparing packets for other sidelink transmissions and/or the periodicity/arrival rate of data packets may further increase latency when multiplexing sidelink resource information with other sidelink transmissions.

Some wireless communications systems may attempt to implement techniques for sidelink time/frequency resource information forwarding based on characteristics of an expected or potential conflict, a type of conflict, sensing operations (e.g., SCI sensing operations) performed by the respective UEs 115, characteristics of sidelink resources with respect to cast types, and the like. However, in the context of sidelink resource information forwarding, there is a tradeoff between improved sidelink network coordination and increased signaling overhead. For example, if the first UE 115-a refrains from transmitting/forwarding any sidelink resource information (e.g., refrain from forwarding detected/ sensed SCI), there may be an increase in conflicts within the sidelink network due to the lack of coordination between UEs 115. Conversely, if the first UE 115-a transmits/forwards all sidelink resource information (e.g., forwards all detected/sensed SCI), signaling overhead and congestion within the wireless communications system 200 may be significantly increased, thereby detrimentally affecting the reliability of sidelink communications. Moreover, transmitting/forwarding all sidelink resource information may consume shared sidelink resources which may be used for other sidelink communications at the first UE 115-a and/or other UEs 115, detrimentally affecting the utilization of sidelink resources.

Accordingly, the UEs 115 and the base station 105-a of the wireless communications system 200 may be configured to provide for the transmission of time/frequency resource information for sidelink communications which reduces sidelink conflicts while preventing significant increases in signaling overhead. In particular, according to techniques described herein, UEs 115 of the wireless communications system 200 may be configured with one or more "reporting configurations" for transmitting (e.g., forwarding) time/ frequency resource information for sidelink communications to improve sidelink network coordination and reduce network congestion.

For example, the first UE 115-a may receive one or more reporting configurations 210 for transmitting sidelink messages 225 including time/frequency resource information for sidelink communications. The first UE 115-a may receive the indication of the one or more reporting configurations 210 from the base station 105-a, another wireless device (e.g., another UE 115), or both. In some cases, the indication of the one or more reporting configurations 210 may be conveyed via an RRC message, a DCI message, a synchronization signal block (SSB) message, a system information broadcast (SIB) message, an SCI message, or any combination thereof. In additional or alternative cases, the first UE 115-a may be configured (e.g., pre-configured) with the one or more reporting configurations 210 without signaling.

In some aspects, the one or more reporting configurations 210 may include one or more parameters or characteristics for transmitting (e.g., forwarding) sidelink messages 225 including time/frequency resource information for sidelink communications. Parameters associated with a reporting configuration 210 may include, but are not limited to, characteristics or rules for detecting a conflict of sidelink communications, a quantity of slots for transmitting sidelink messages 225 including time/frequency resource information, a periodicity for transmitting sidelink messages 225 including time/frequency resource information, data (e.g., time/frequency resource information) to be included within sidelink messages 225 and the like. For instance, a reporting configuration 210 may indicate that the first UE 115-a is to transmit time/frequency resource information for a defined quantity of slots after detecting a sidelink conflict, according to a periodicity (e.g., every slot, every other slot) following a detected conflict, or any combination thereof.

Additionally or alternatively, a reporting configuration 210 may be associated with a set of rules or other parameters which may be used by the first UE 115-a to determine parameters/characteristics of the respective reporting configuration 210. In this regard, the first UE 115-a may be configured with one or more reporting configurations 210 which may control when and/or how often the first UE 115-a is to transmit (e.g., relay, forward) sidelink messages 225 including time/frequency resource information for sidelink communications. In additional or alternative aspects, the first UE 115-a may be configured (e.g., pre-configured) with one or more reporting configurations 210. In such cases, the first UE 115-a may be configured to determine a reporting configuration 210 which is to be used without any signaling from the base station 105-a.

In some aspects, the first UE 115-a may monitor a sidelink network (e.g., monitor sidelink communication links 205-b and 205-c). The first UE 115-a may monitor the sidelink network based on receiving the one or more reporting configurations 210. In some aspects, the first UE 115-a may monitor the sidelink network by decoding (e.g., blindly decoding) sidelink communications performed over the sidelink communication link 205-b, sidelink communication link 205-c, and/or additional sidelink communication links 205. For example, the first UE 115-a may monitor the sidelink network by blindly decoding sidelink communications which are sensed within a PSCCH and/or PSSCH of the sidelink network. The first UE 115-a may monitor the sidelink network in order to identify sidelink resources which have been reserved by the second UE 115-b and/or the third UE 115-c, to determine characteristics associated with the sidelink network, or any combination thereof.

The first UE 115-a may determine a network congestion of the sidelink network. The first UE 115-a may determine the network congestion based on receiving the reporting configurations 210, monitoring the sidelink network, or both. Network congestion may be associated with a relative quantity, density, or frequency of sidelink communications performed over the sidelink network. For example, in cases where the first UE 115-a identifies large quantities of sidelink communications performed over the sidelink network, the first UE 115-a may be configured to determine that the sidelink network is associated with relatively high network congestion. Comparatively, in cases where the first UE 115-a identifies small quantities of sidelink communications performed over the sidelink network, the first UE 115-a may be configured to determine that the sidelink network is associated with relatively low network congestion.

In some aspects, the first UE 115-a may determine one or more parameters or characteristics associated with transmitting/forwarding time and frequency resource information associated with sidelink communications. In this regard, the first UE 115-a may determine one or more parameters or characteristics associated with a reporting configuration 210. As such, the first UE 115-a may determine the one or more parameters based on receiving the reporting configurations 210, monitoring the sidelink network, determining the network congestion, or any combination thereof.

For example, the first UE 115-a may be configured to determine a quantity of slots and/or a periodicity for transmitting sidelink messages 225 including time/frequency resource information associated with sidelink communications based on the determined network congestion. For instance, in cases where the first UE 115-a determines a relatively high network congestion (e.g., frequent sidelink communications), the first UE 115-a may determine that there is a relatively high likelihood of sidelink conflicts, and may determine that sidelink messages 225 including time/frequency resource information should be transmitted more frequently (e.g., higher periodicity) and/or for longer durations of time (e.g., across larger quantities of slots). Comparatively, in cases where the first UE 115-a determines a relatively low network congestion (e.g., infrequent sidelink communications), the first UE 115-a may determine that there is a relatively low likelihood of sidelink conflicts, and may determine that sidelink messages 225 including time/frequency resource information may be transmitted less frequently (e.g., lower periodicity) and/or for shorter durations of time (e.g., across smaller quantities of slots).

Additionally or alternatively, as noted previously herein, parameters for transmitting sidelink messages 225 including time/frequency resource information (e.g., quantities of slots for transmitting sidelink messages 225, periodicity of sidelink messages 225) may be indicated via the reporting configurations 210.

In some aspects, the first UE 115-a may receive SCIs 215 from the second UE 115-b, the third UE 115-c, or both. For example, the first UE 115-a may receive a first SCI 215 from the second UE 115-b, and a second SCI 215-b from the third UE 115-c. Moreover, the first UE 115-a may receive additional SCIs 215 from additional UEs 115 of the wireless communications system 200. In some cases, the first UE 115-a may receive the SCIs 215 based on monitoring the sidelink network. The first SCIs 215-a, 215-b may be received via a PSCCH, a PSSCH, or both.

In some aspects, the SCIs 215 may reserve sets of sidelink resources for sidelink transmissions 220 to be performed by (e.g., transmitted or received by) the respective UEs 115-b, 115-c. For example, the first SCI 215-a may reserve a first set of sidelink resources for a first sidelink transmission 220-a to be transmitted by the second UE 115-b. Similarly, the second SCI 215-b may reserve a second set of sidelink resources for a second sidelink transmission 220-b to be transmitted by the third UE 115-c. In other words, the first SCI 215-a may schedule the first sidelink transmission 220-a, and the second SCI 215-b may schedule the second sidelink transmission 220-b. Accordingly, the second and third UEs 115-b, 115-c may transmit the SCIs 215 scheduling the respective sidelink transmissions 220 based on the sidelink network being operated according to a Mode 2, as described previously herein. The second and third UEs 115-b, 115-c may transmit the SCIs 215-a, 215-b via unicast techniques, multicast/groupcast techniques, broadcast techniques, or any combination thereof.

In cases where the first SCI 215-a and the second SCI 215-b schedule sidelink transmission 220-a and sidelink transmission 220-b, respectively, the sets of resources reserved for the respective sidelink transmissions 220 may be in conflict with one another. For example, a conflict may arise when a first set of sidelink resources reserved by the first SCI 215-a and a second set of sidelink resources reserved by the second SCI 215-*b* at least partially overlap in the time domain and the frequency domain.

Upon receiving the SCIs 215, the first UE 115-*a* may process (e.g., demodulate, decode) the first SCI 215-*a*, the second SCI 215-*b*, or both. The first UE 115-*a* may process any quantity of SCIs 215 received from any quantity of UEs 115, including the second UE 115-*b* and the third UE 115-*c*. In some aspects, processing of the received SCIs 215 may be associated with a processing time interval of the first UE 115-*a*. The processing time interval may be associated with (e.g., define) a time interval in which the first UE 115-*a* is capable of receiving and decoding the data included within received SCIs 215 and/or other communications (e.g., PSCCH processing time). Accordingly, the first UE 115-*a* may process (e.g., demodulate, decode) the received SCIs 215 during (e.g., within) a processing time interval associated with the first UE 115-*a*. In some aspects, a duration of the processing time interval may be based on a processing power or processing capability at the first UE 115-*a*.

In some aspects, a processing time interval associated with the first UE 115-*a* may apply to each received SCI 215. In other words, the first UE 115-*a* may process the first SCI 215-*a* within a first processing time interval for the first SCI 215-*a*, and may process the second SCI 215-*b* within a second processing time interval for the second SCI 215-*b*. In this regard, the processing time interval for each respective SCI 215 may vary depending on the data payload size of the respective SCIs 215.

The first UE 115-*a* may detect a conflict between multiple sidelink transmissions 220. In some aspects, the conflict may arise from at least partial overlap of multiple sidelink transmissions 220 which are transmitted, or scheduled to be transmitted, by two or more other UEs 115 (e.g., second UE 115-*b*, third UE 115-*c*). The first UE 115-*a* may detect the conflict of sidelink communications based on receiving the reporting configurations 210, monitoring the sidelink network, determining network congestion, determining parameters of the reporting configuration 210, receiving the first SCI 215-*a* and/or the second SCI 215-*b*, processing the received SCIs 215, or any combination thereof.

The first UE 115-*a* may be configured to detect a conflict between sidelink communications based on actually receiving conflicting (e.g., colliding) sidelink communications (e.g., sidelink transmissions 220), identifying an overlap of reserved sidelink resources which are reserved for future sidelink communications, or both. For example, in some cases, the first UE 115-*a* may detect a conflict by receiving at least two sidelink transmissions 220 from two or more other UEs 115 on overlapping time and frequency resources. For instance, the first UE 115-*a* may receive a first sidelink transmission 220-*a* from the second UE 115-*b* and may receive a second sidelink transmission 220-*b* from the third UE 115-*c*. In this example, the first UE 115-*a* may detect a conflict based on the first sidelink transmission 220-*a* and the second sidelink transmission 220-*b* being received within at least partially overlapping time and frequency resources. In this example, because the first and second sidelink transmissions 220 are transmitted/received using overlapping time and frequency resources, the sidelink transmissions 220 may be said to be in conflict due to the fact that the first and second sidelink transmissions 220 may "collide" with one another at the first UE 115-*a*. Similarly, in the case of a half-duplex conflict, the first UE 115-*a* may detect a conflict based on receiving the first sidelink transmission 220-*a* from the second UE 115-*a* and the second sidelink transmission 220-*b* from the third UE 115-*c* concurrently (e.g., at the same time).

In additional or other cases, the first UE 115-*a* may detect a conflict based on the reservation of sidelink resources for future sidelink communications. In this regard, the first UE 115-*a* may detect a conflict based on receiving an indication that at least two sidelink transmissions 220 from other UEs 115 are scheduled to at least partially overlap in time and frequency resources. For example, as noted previously herein, the first SCI 215-*a* received from the second UE 115-*b* may schedule a first sidelink transmission 220-*a* to be transmitted by the second UE 115-*b* using a first set of sidelink resources. Similarly, the second SCI 215-*b* received from the third UE 115-*c* may schedule a second sidelink transmission 220-*b* to be transmitted by the third UE 115-*c* using a second set of sidelink resources. In this example, the first UE 115-*a* may detect a conflict based on determining that the first set of sidelink resources and the second set of sidelink resources at least partially overlap in the time and frequency domain. In other words, the first UE 115-*a* may detect the conflict based on determining that the first sidelink transmission 220-*a* and the second sidelink transmission 220-*b* are scheduled to overlap in time and frequency resources (e.g., collide with one another).

In some aspects, the first UE 115-*a* may generate a sidelink message 225-*a* based on the detected conflict. In some aspects, the sidelink message 225-*a* may include time and frequency resource information associated with SCIs which were received and processed by the first UE 115-*a* prior to detection of the conflict. In this regard, the first UE 115-*a* may generate the sidelink message 225-*a* based on receiving the reporting configurations 210, monitoring the sidelink network, determining network congestion, determining parameters of the reporting configuration 210, receiving the first SCI 215-*a* and/or second SCI 215-*b*, processing the received SCIs 215, detecting the conflict, or any combination thereof.

In some aspects, the first UE 115-*a* may generate the sidelink message 225-*a* including time and frequency resource information so that the sidelink message 225-*a* may be distributed to neighboring UEs 115 (e.g., second UE 115-*b*, third UE 115-*c*) in order to inform neighboring UEs 115 as to which sidelink resource may or may not be used for future sidelink communications. As such, the first UE 115-*a* may generate the sidelink message 225-*a* in order to increase sidelink network coordination, and reduce or eliminate a likelihood of future conflicts between sidelink communications. For example, the time and frequency resource information included within the generated sidelink message 225-*a* may indicate a first set of sidelink resources which is available for subsequent sidelink communications, and a second set of sidelink resources which is not available for subsequent sidelink communications. In other words, time and frequency resource information may indicate sets of sidelink resources which have already been claimed or reserved by other UEs 115 for sidelink communications (e.g., sets of sidelink resources which are unavailable for future sidelink communications), and/or sets of sidelink resources which have not been previously claimed or reserved by other UEs 115 for sidelink communications (e.g., sets of sidelink resources which are available for future sidelink communications).

In some aspects the first UE 115-*a* may generate the sidelink message 225-*a* during a preparation time interval (e.g., preparation time interval for generating/preparing sidelink messages 225). In some aspects, the preparation time interval (e.g., start of the preparation time interval) may be based on detection of the conflict. For example, the preparation time interval for generating the sidelink message

225-*a* may begin upon detection of the conflict. In other words, the first UE 115-*a* may begin generating the sidelink message 225-*a* following detection of the conflict.

In some aspects, the time and frequency resource information included within the sidelink message 225-*a* may be based on SCIs 215 (e.g., first SCI 215-*a*, second SCI 215-*b*) which were received and processed prior to an end of a processing time interval at the first UE 115-*a* and/or processed prior to detection of the conflict. Conversely, the time and frequency resource information may not include resource information associated with SCIs 215 which were not received and/or processed prior to an end of the processing time interval.

For example, the first UE 115-*a* may receive and process the first SCI 215-*a* and the second SCI 215-*b* received from the second UE 115-*b* and third UE 115-*c*, respectively, prior to an end of a processing time interval and prior to detection of the conflict. Comparatively, the first UE 115-*a* may receive a third SCI 215 from an additional UE 115, but may not have adequate time to process the third SCI 215 prior to an end of the processing time interval and/or prior to detection of the conflict. In this example, the time and frequency resource information included within the sidelink message 225-*a* may be based on sidelink resource reservations made in the first SCI 215-*a* and the second SCI 215-*b*, but not based on sidelink resource reservations made in the third SCI 215. In other words, according to some implementations, SCIs 215 and other sidelink communications which reserve sidelink resources but are not able to be processed (e.g., decoded) at the first UE 115-*a* prior to an end of the processing time interval and/or prior to detection of the conflict may not be reflected in the time and frequency resource information within the sidelink message 225-*a*.

In some aspects, all or only a portion of data included within SCIs 215 which were received and processed prior to detection of the conflict may be included within the sidelink message 225-*a*. For example, in some cases, the first UE 115-*a* may include all the data (e.g., all the time/frequency reservation data) included within the first SCI 215-*a* and the second SCI 215-*b* within the generated sidelink message 225-*a*. In such cases, the first UE 115-*a* may be configured to generate the sidelink message 225-*a* by packaging the first SCI 215-*a* and the second SCI 215-*b* into a new sidelink message 225-*a* which will be transmitted (e.g., forwarded, relayed) to other UEs 115. In other cases, the first UE 115-*a* may include only a portion of the data included within the first SCI 215-*a* and the second SCI 215-*b* within the generated sidelink message 225-*a*. For instance, in some cases, the sidelink message 225-*a* may include decoded data from the first and second SCIs 215.

Subsequently, the first UE 115-*a* may transmit the sidelink message 225-*a* including the time and frequency resource information. In some aspects, the first UE 115-*a* may transmit the sidelink message 225-*a* to the second UE 115-*b*, the third UE 115-*c*, or both. In additional or alternative aspects, the first UE 115-*a* may transmit the sidelink message 225-*a* including the time and frequency resource information to other UEs 115 (e.g., neighboring UEs 115) within the wireless communications system. In this regard, the first UE 115-*a* may be configured to transmit the sidelink message 225-*a* via unicast techniques, groupcast/multicast techniques, broadcast techniques, or any combination thereof.

The first UE 115-*a* may transmit the sidelink message 225-*a* based on receiving the reporting configurations 210, monitoring the sidelink network, determining network congestion, determining parameters of the reporting configuration 210, receiving the first SCI 215-*a* and/or second SCI 215-*b*, processing the received SCIs 215, detecting the conflict, generating the sidelink message 225-*a*, or any combination thereof. For example, the first UE 115-*a* may transmit the sidelink message 225-*a* in accordance with the reporting configuration 210. For instance, the reporting configuration 210 may indicate a set of rules or parameters which indicate what time/frequency resource information is to be included within the sidelink message 225-*a*, a timing for transmitting the sidelink message 225-*a*, or both, and the first UE 115-*a* may transmit the sidelink message 225-*a* in accordance with the rules/parameters associated with the reporting configuration 210.

In some aspects, the sidelink message 225-*a* may include an indication of the detected conflict. For example, the sidelink message 225-*a* may include a post-collision indicator, a half-duplex indicator, or other indicator which is associated with the detected conflict. In some aspects, the first UE 115-*a* may transmit the sidelink message 225-*a* in the same slot or TTI in which the conflict was detected. Additionally or alternatively, the first UE 115-*a* may transmit the sidelink message 225-*a* in a TTI which follows the TTI in which the conflict was detected.

As noted previously herein, the first UE 115-*a* may distribute the sidelink message 225-*a* to neighboring UEs 115 (e.g., second UE 115-*b*, third UE 115-*c*) in order to inform neighboring UEs 115 as to potential future conflicts and/or to inform the neighboring UEs 115 which sidelink resource may or may not be used for future sidelink communications. As such, the first UE 115-*a* may transmit the sidelink message 225-*a* in order to increase sidelink network coordination, and reduce or eliminate a likelihood of future conflicts between sidelink communications. For example, the time and frequency resource information included within the generated sidelink message 225-*a* may indicate a first set of sidelink resources which is available for subsequent sidelink communications, and a second set of sidelink resources which is not available for subsequent sidelink communications. In other words, time and frequency resource information included within the sidelink message 225-*a* may indicate sets of sidelink resources which have already been claimed or reserved by other UEs 115 for sidelink communications (e.g., sets of sidelink resources which are unavailable for future sidelink communications), and/or sets of sidelink resources which have not been previously claimed or reserved by other UEs 115 for sidelink communications (e.g., sets of sidelink resources which are available for future sidelink communications).

In some cases, the sidelink message 225-*a* may include all of the information included within SCIs 215 which were received/processed prior to detection of the conflict. For example, in some cases, the first UE 115-*a* may generate and/or transmit the sidelink message 225-*a* by forwarding the first SCI 215-*a* and/or the second SCI 215-*b* which was received and processed by the first UE 115-*a* prior to detection of the conflict. In additional or alternative cases, the sidelink message 225-*a* may include only a portion of the information included within SCIs 215 which were received/processed prior to detection of the conflict.

The sidelink message 225-*a* may be transmitted via a sidelink control channel (e.g., PSCCH), a sidelink shared channel (e.g., PSSCH), a sidelink feedback channel (e.g., PSFCH), or any combination thereof. In some aspects, the sidelink message 225-*a* may be transmitted as its own sidelink communication (e.g., standalone PSCCH message and/or PSSCH message). In additional or alternative cases, the sidelink message 225-*a* may be combined with (e.g., multiplexed with, piggybacked with) other sidelink communications. For example, the first UE 115-a may multiplex the time and frequency resource information with another sidelink data message (e.g., multiples time and frequency resource information with a PSSCH transmission).

The first UE 115-a may determine to multiplex the time/frequency resource information with other sidelink data messages based on a relative timing of the other sidelink data messages and/or a relative increase in latency of the time/frequency resource information attributable to the multiplexing. For instance, if the next scheduled sidelink data transmission will increase the latency of the time/frequency resource information by more than some latency threshold, the first UE 115-a may determine to transmit the sidelink message 225-a including the time/frequency resource information as a standalone sidelink message 225-a. In some cases, the reporting configuration 210 may indicate whether the sidelink message 225-a may be transmitted as a standalone message, or multiplexed with other sidelink communications.

In some implementations, the first UE 115-a may generate additional sidelink messages 225 (e.g., sidelink messages 225-b, 225-c) based on the conflict detected at 540. In some aspects, the additional sidelink messages 225 may include updated time and frequency resource information associated with SCIs 215 which were received and processed by the first UE 115-a after to detection of the conflict. In this regard, the first UE 115-a may generate the additional sidelink messages 225 based on receiving the reporting configurations 210, monitoring the sidelink network, determining network congestion, determining parameters of the reporting configuration 210, receiving the first SCI 215-a and/or second SCI 215-b, processing the received SCIs 215, detecting the conflict, generating/transmitting the sidelink message 225-a, or any combination thereof.

In some aspects, the updated time and frequency resource information within the additional sidelink messages 225 (e.g., sidelink messages 225-b, 225-c) may be updated relative to the time and frequency information included within the sidelink message 225-a. In this regard, the updated time and frequency resource information may be based on SCIs 215 which were received after detection of the conflict, SCIs received after generation of the sidelink message 225-a, SCIs 215 which were received but not processed prior to detection of the conflict, or both.

For example, as noted previously herein, the first UE 115-a may receive and process the first SCI 215-a and the second SCI 215-b prior to detection of the conflict. Comparatively, the first UE 115-a may receive a third SCI 215 from an additional UE 115, but may not have adequate time to process the third SCI 215 prior to detection of the conflict. In this example, the updated time and frequency resource information included within the additional sidelink messages 225 (e.g., sidelink messages 225-b, 225-c) may be based on the third SCI 215. By way of another example, the updated time and frequency resource information may be based on SCIs 215 which were received after detection of the conflict.

In some aspects the first UE 115-a may generate (or refrain from generating) the additional sidelink messages 225 (e.g., sidelink messages 225-b, 225-c) based on (e.g., in accordance with) the reporting configuration 210. For example, a first reporting configuration 210 may cause the first UE 115-a to transmit only a single sidelink message 225 (e.g., sidelink message 225-a) including time and frequency resource information upon detection of a conflict. In this example, the first UE 115-a may refrain from generating the additional sidelink messages 225 based on (e.g., in accordance with) the first reporting configuration 210.

Comparatively, other reporting configurations 210 may cause the first UE 115-a to transmit multiple sidelink messages 225 including time and frequency resource information upon detection of a conflict. For example, a second reporting configuration 210 may cause the first UE 115-a to generate/transmit additional sidelink messages 225 including updated time/frequency resource information within every slot for a predetermined quantity of slots following detection of a conflict. In such cases, the first UE 115-a may generate a second sidelink message 225-b and/or a third sidelink message 225-c in accordance with the second reporting configuration 210. In particular, the first UE 115-a may generate an additional sidelink message 225 within every slot for a predetermined quantity of slots following detection of the conflict in accordance with the second reporting configuration 210. In this example, each additional sidelink message 225 (e.g., sidelink messages 225-b, 225-c) may include updated time/frequency resource information, which has been updated relative to the preceding sidelink message 225-a.

By way of another example, a third reporting configuration 210 may cause the first UE 115-a to generate/transmit additional sidelink messages 225 including updated time/frequency resource information in accordance with a periodicity (e.g., every n slots) for a predetermined quantity of slots following detection of a conflict. In such cases, the first UE 115-a may generate the additional sidelink messages 225 (e.g., sidelink messages 225-b, 225-c) in accordance with the periodicity for the predetermined quantity of slots associated with the third reporting configuration 210. For instance, the third reporting configuration 210 may cause the first UE 115-a to transmit sidelink messages 225 every other slot (e.g., periodicity of two slots) for a total of four slots (e.g., quantity of slots=4). In such cases, the first UE 115-a may generate a second sidelink message 225-b for transmission two slots after detection of the conflict and/or transmission of the first sidelink message 225-a. Similarly, continuing with the same example, the first UE 115-a may generate a third sidelink message 225-c for transmission four slots after detection of the conflict and/or transmission of the first sidelink message 225-a. In this example, each additional sidelink message 225 (e.g., second sidelink message 225-b, third sidelink message 225-c) may include updated time/frequency resource information which has been updated relative to the preceding sidelink message 225.

Subsequently, the first UE 115-a may transmit the additional sidelink messages 225 (e.g., sidelink messages 225-b, 225-c) including the updated time and frequency resource information. In some aspects, the first UE 115-a may transmit the additional sidelink messages 225 to the second UE 115-b, the third UE 115-c, or both. In additional or alternative aspects, the first UE 115-a may transmit the additional sidelink messages 225 including the updated time and frequency resource information to other UEs 115 (e.g., neighboring UEs 115) within the wireless communications system. In this regard, the first UE 115-a may be configured to transmit the additional sidelink messages 225 via unicast techniques, groupcast/multicast techniques, broadcast techniques, or any combination thereof.

The first UE 115-a may transmit the additional sidelink messages 225 (e.g., sidelink messages 225-b, 225-c) based on receiving the reporting configurations 210, monitoring the sidelink network, determining network congestion, determining parameters of the reporting configuration 210, receiving the first SCI 215-a and/or second SCI 215-b, processing the received SCIs 215, detecting the conflict, generating/transmitting the sidelink message 225-*a*, generating the additional sidelink messages 225, or any combination thereof.

For example, the first UE 115-*a* may transmit the additional sidelink message 225 (e.g., sidelink messages 225-*b*, 225-*c*) in accordance with the reporting configuration 210. For instance, a second reporting configuration 210 may indicate for the first UE 115-*a* to transmit additional sidelink messages 225 within every slot for a predetermined quantity of slots, and the first UE 115-*a* may transmit the additional sidelink messages 225 (e.g., sidelink messages 225-*b*, 225-*c*) in accordance with the second reporting configuration 210. By way of another example, a third reporting configuration 210 may indicate for the first UE 115-*a* to transmit additional sidelink messages 225 in accordance with a periodicity (e.g., every n slots) for a predetermined quantity of slots, and the first UE 115-*a* may transmit the additional sidelink messages 225 (e.g., sidelink messages 225-*b*, 225-*c*) in accordance with the third reporting configuration 210.

Techniques described herein may improve sidelink network coordination to reduce sidelink conflicts while preventing significant increases in signaling overhead. In particular, techniques described herein may enable the first UE 115-*a* to transmit (e.g., forward, relay) sidelink time/frequency resource information according to one or more reporting configurations 210 upon identifying a conflict in sidelink communications. By transmitting time/frequency resource information in accordance with reporting configurations 210, techniques described herein may reduce or eliminate sidelink conflicts during Mode 2 sidelink operation, thereby improving an efficiency and reliability of sidelink communications.

Figure 3:
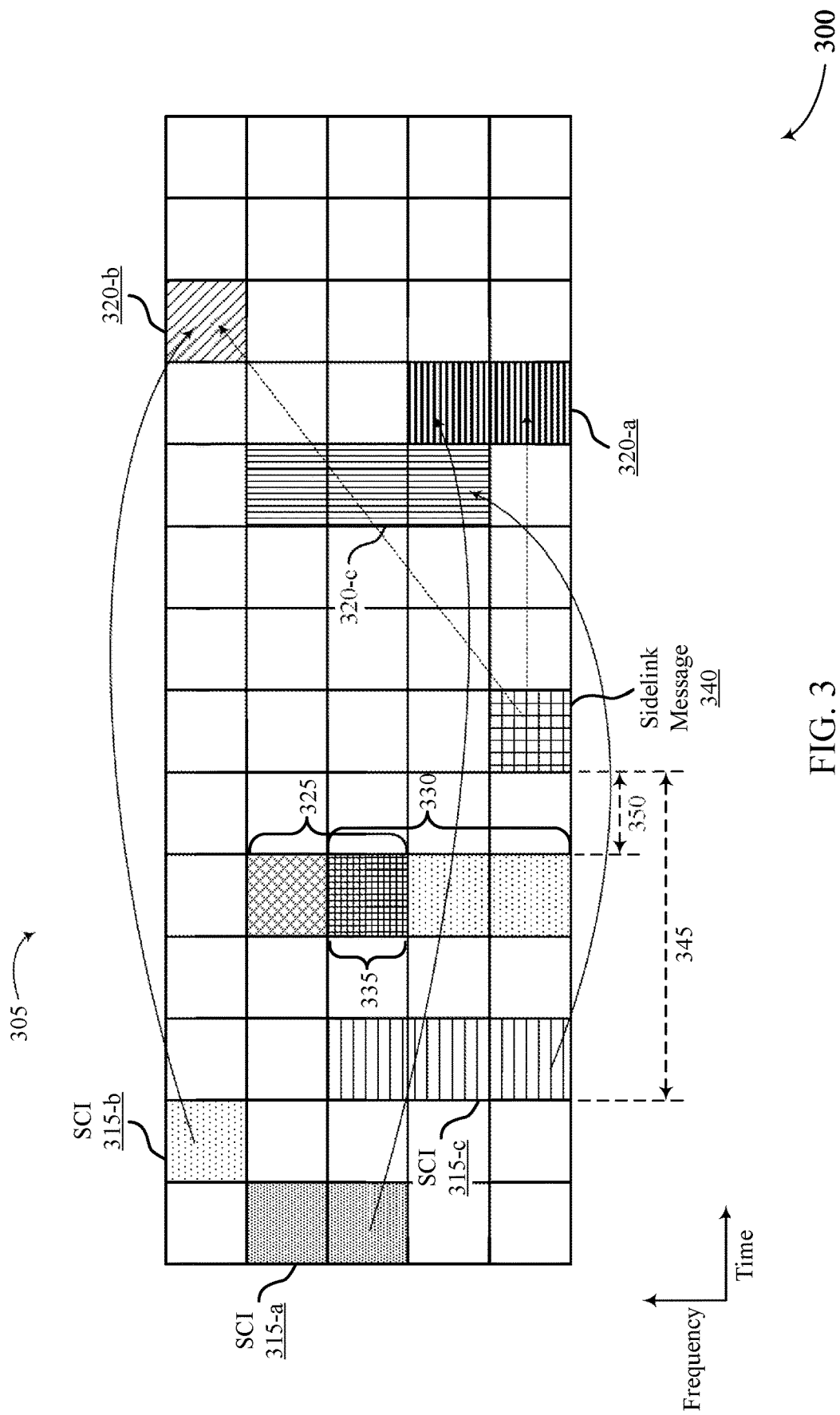
FIG. 3 illustrates an example of a resource configuration that supports techniques for sidelink resource information forwarding in accordance with aspects of the present disclosure.

FIG. 3 illustrates an example of a resource configuration 300 that supports techniques for sidelink resource information forwarding in accordance with aspects of the present disclosure. In some examples, the resource configuration 300 may implement, or be implemented by, aspects of wireless communications system 100, wireless communications system 200, or both.

In some aspects, the resource configuration 300 illustrates various signaling which may be used for forwarding (e.g., relaying) time and frequency resource information associated with sidelink communications. For example, resource configuration 300 illustrates a set of sidelink resources 305 which may be used for sidelink communications between wireless devices (e.g., UEs 115). In some aspects, a UE 115 may receive one or more SCIs 315 from one or more UEs 115. In some aspects, each SCI 315 may reserve a set of sidelink resources for performing a sidelink transmission 320. For example, a first SCI 315-*a* may schedule a first sidelink transmission 320-*a* associated with a first set of sidelink resources. Similarly, a second SCI 315-*b* may schedule a second sidelink transmission 320-*b* associated with a second set of sidelink resources, and a third SCI 315-*c* may schedule a third sidelink transmission 320-*c* associated with a third set of sidelink resources. In this regard, the first SCI 315-*a*, the second SCI 315-*b*, and the third SCI 315-*c* may schedule the first sidelink transmission 320-*a*, the second sidelink transmission 320-*b*, and the third sidelink transmission 320-*c*, respectively.

As noted previously herein, processing of the received SCIs 315 may be associated with a processing time interval 345 of the UE 115. The processing time interval 345 may be associated with (e.g., define) a time interval in which the UE 115 is capable of receiving and decoding the data included within received SCIs 315 and/or other communications (e.g., PSCCH processing time). Accordingly, the UE 115 may process (e.g., demodulate, decode) the received SCIs 315 during (e.g., within) a processing time interval 345 associated with the first UE 115-*a*. In some aspects, a duration of the processing time interval 345 may be based on a processing power or processing capability at the first UE 115-*a*. Additionally or alternatively, each SCI 315 may be associated with a different processing time interval 345 at the UE 115. In other words, the processing time interval 345 illustrated in FIG. 3 may be associated with the third SCI 315-*c*, and may be different than processing time intervals 345 associated with the first and second SCIs 315-*a*, 315-*b*. In this regard, the processing time interval 345 for each respective SCI 315 may vary depending on the data payload size of the respective SCI 315.

Subsequently, the UE 115 may detect a conflict 335 associated with sidelink communications. As noted previously herein, a UE 115 may be configured to detect a conflict 335 between sidelink communications based on actually receiving conflicting (e.g., colliding) sidelink communications, identifying an overlap of reserved sidelink resources which are reserved for future sidelink communications, or both. For example, as shown in FIG. 3, the UE 115 may receive a first sidelink communication 325 and a second sidelink communication 330, where the first sidelink communication 325 and the second sidelink communication 330 at least partially overlap in the time and frequency domain. In this regard, the UE 115 may detect a conflict 335 based on the first sidelink communication 325 and the second sidelink communication 330 overlapping, or colliding with one another.

In some aspects, detection of the conflict 335 may trigger the UE 115 to forward/relay time and frequency resource information associated with sidelink communications. As such, upon detecting the conflict, the UE 115 may generate a sidelink message 340 based on the detected conflict 335. In some aspects the UE 115 may generate the sidelink message 340 including time/frequency resource information during a preparation time interval 350 (e.g., preparation time interval 350 for generating/preparing sidelink messages 340). In some aspects, the preparation time interval 350 (e.g., start of the preparation time interval 350) may be based on detection of the conflict 335. For example, the preparation time interval 350 for generating the sidelink message 340 may begin upon detection of the conflict 335. In other words, the first UE 115-*a* may begin generating the sidelink message 340 following detection of the conflict 335.

In some aspects, the sidelink message 340 may include time and frequency resource information associated with SCIs 315 which were received and processed by the UE 115 prior to detection of the conflict 335. In some aspects, the UE 115 may generate the sidelink message 340 including time and frequency resource information so that the sidelink message 340 may be distributed to neighboring UEs 115 in order to inform neighboring UEs 115 as to which sidelink resource may or may not be used for future sidelink communications. As such, the UE 115 may generate the sidelink message 340 in order to increase sidelink network coordination, and reduce or eliminate a likelihood of future conflict 335 between sidelink communications. For example, the time and frequency resource information included within the generated sidelink message 340 may indicate a first set of sidelink resources which is available for subsequent sidelink communications, and a second set of sidelink resources which is not available for subsequent sidelink communications.

In some aspects, the time and frequency resource information included within the sidelink message 340 may be based on SCIs 315 which were received and processed prior to an end of a processing time interval 345 at the first UE 115-a and/or processed prior to detection of the conflict 335. Conversely, the time and frequency resource information may not include resource information associated with SCIs 315 which were not received and/or processed prior to an end of the processing time interval.

For example, the UE 115 may receive and process the first SCI 315-a and the second SCI 315-b prior to an end of a processing time interval for the respective SCIs 315-a, 315-b and prior to detection of the conflict 335. Comparatively, the UE 115 may not have adequate time to process the third SCI 315-c prior to an end of the processing time interval 345 and/or prior to detection of the conflict 335. In this example, the time and frequency resource information included within the sidelink message 340 may be based on sidelink resource reservations made in the first SCI 315-a and the second SCI 315-b, but not based on sidelink resource reservations made in the third SCI 315-c. As such, the time and frequency resource information included within the sidelink message 340 may indicate that sidelink resources associated with the first sidelink transmission 320-a and the second sidelink transmission 320-b are not available for future sidelink communications. Conversely, because the third SCI 315-c was not able to be processed prior to an end of the processing time interval and/or prior to detection of the conflict 335, the sidelink message 340 may not include any information regarding the sidelink resources associated with the third sidelink transmission 320-c.

Subsequently, the UE 115 may transmit the sidelink message 340 including the time and frequency resource information. The UE 115 may transmit the sidelink message 340 based on (e.g., in accordance with) a reporting configuration. For example, in cases where the UE 115 is configured with a reporting configuration which causes the UE 115 to transmit a single sidelink message 340 upon detecting a conflict 335, the UE 115 may transmit the sidelink message 340, but no additional sidelink messages 340, as shown in FIG. 3.

In some aspects, the UE 115 may transmit the sidelink message 340 to the UEs 115 which performed the first sidelink communication 325 and/or second sidelink communication 330 associated with the conflict 335. In additional or alternative aspects, the UE 115 may transmit the sidelink message 340 including the time and frequency resource information to other UEs 115 (e.g., neighboring UEs 115) within the wireless communications system. In this regard, the UE 115 may be configured to transmit the sidelink message 340 via unicast techniques, groupcast/multicast techniques, broadcast techniques, or any combination thereof.

In some aspects, the sidelink message 340 may include an indication of the detected conflict 335. For example, the sidelink message 340 may include a post-collision indicator, a half-duplex indicator, or other indicator which is associated with the detected conflict 335. In some aspects, the UE 115 may transmit the sidelink message 340 in the same slot or TTI in which the conflict 335 was detected.

As noted previously herein, the first UE 115-a may distribute the sidelink message 340 to neighboring UEs 115 in order to inform neighboring UEs 115 as to potential future conflicts 335 and/or to inform the neighboring UEs 115 which sidelink resource may or may not be used for future sidelink communications. As such, the first UE 115-a may transmit the sidelink message 340 in order to increase sidelink network coordination, and reduce or eliminate a likelihood of future conflicts 335 between sidelink communications.

Figure 4:
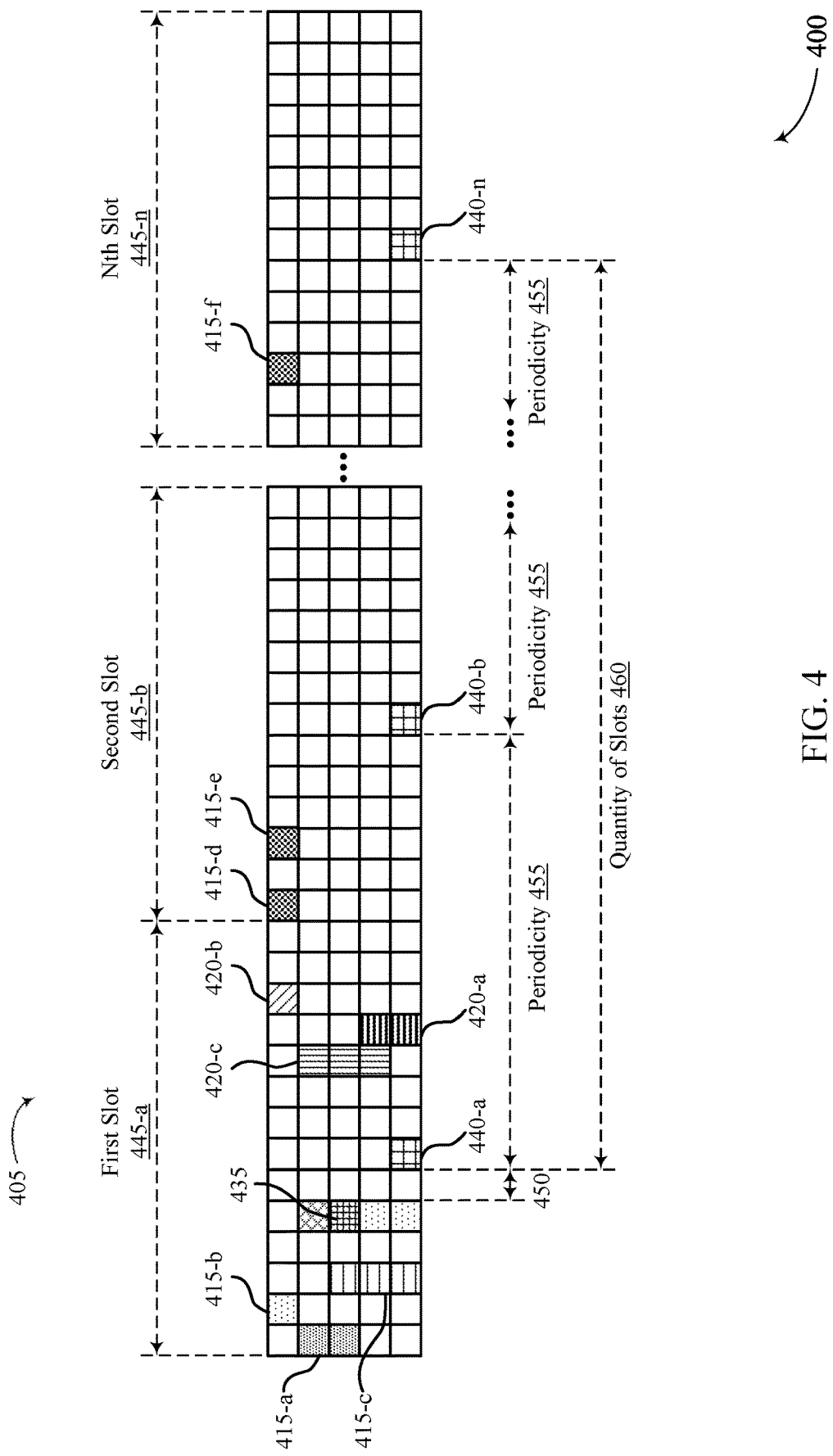
FIG. 4 illustrates an example of a resource configuration that supports techniques for sidelink resource information forwarding in accordance with aspects of the present disclosure.

FIG. 4 illustrates an example of a resource configuration 400 that supports techniques for sidelink resource information forwarding in accordance with aspects of the present disclosure. In some examples, the resource configuration 300 may implement, or be implemented by, aspects of wireless communications system 100, wireless communications system 200, resource configuration 300, or any combination thereof.

In some aspects, the resource configuration 400 illustrates various signaling which may be used for forwarding (e.g., relaying) time and frequency resource information associated with sidelink communications. Moreover, any description associated with the resource configuration 300 illustrated in FIG. 3 may be regarded as applying to resource configuration 400, unless noted otherwise herein.

For example, as described with reference to resource configuration 300 illustrated in FIG. 3, resource configuration 400 illustrates a set of sidelink resources 405 which may be used for sidelink communications between wireless devices (e.g., UEs 115). The set of sidelink resources 405 may span across a set of TTIs (e.g., set of slots 445). In some aspects, a UE 115 may receive one or more SCIs 415 from one or more UEs 115. In some aspects, each SCI 415 may reserve a set of sidelink resources for performing a sidelink transmission 420. For example, a first SCI 415-a may schedule a first sidelink transmission 420-a associated with a first set of sidelink resources. Similarly, a second SCI 415-b may schedule a second sidelink transmission 420-b associated with a second set of sidelink resources, and a third SCI 415-c may schedule a third sidelink transmission 420-c associated with a third set of sidelink resources. In this regard, the first SCI 415-a, the second SCI 415-b, and the third SCI 415-c may schedule the first sidelink transmission 420-a, the second sidelink transmission 420-b, and the third sidelink transmission 420-c, respectively.

Subsequently, the UE 115 may detect a conflict 435 associated with sidelink communications. As noted previously herein, a UE 115 may be configured to detect a conflict 435 between sidelink communications based on actually receiving conflicting (e.g., colliding) sidelink communications, identifying an overlap of reserved sidelink resources which are reserved for future sidelink communications, or both. For example, as shown in FIG. 4, the UE 115 may receive a first sidelink communication and a second sidelink communication, where the first sidelink communication and the second sidelink communication at least partially overlap in the time and frequency domain. In this regard, the UE 115 may detect a conflict 435 based on the first communication and the second communication overlapping, or colliding with one another.

In some aspects, detection of the conflict 435 may trigger the UE 115 to forward/relay time and frequency resource information associated with sidelink communications. As such, upon detecting the conflict, the UE 115 may generate a sidelink message 440-a based on the detected conflict 435. In some aspects the UE 115 may generate the sidelink message 440-a including time/frequency resource information during a preparation time interval 450. In some aspects, a start of the preparation time interval 450 may begin after detection of the conflict 435.

In some aspects, the sidelink message 440-a may include time and frequency resource information associated with SCIs 415 which were received and processed by the UE 115 prior to detection of the conflict 435. In some aspects, the UE 115 may generate the sidelink message 440-*a* including time and frequency resource information so that the sidelink message 440-*a* may be distributed to neighboring UEs 115 in order to inform neighboring UEs 115 as to which sidelink resource may or may not be used for future sidelink communications. As such, the UE 115 may generate the sidelink message 440-*a* in order to increase sidelink network coordination, and reduce or eliminate a likelihood of future conflict 435 between sidelink communications. For example, the time and frequency resource information included within the generated sidelink message 440-*a* may indicate a first set of sidelink resources which is available for subsequent sidelink communications, and a second set of sidelink resources which is not available for subsequent sidelink communications.

In some aspects, the time and frequency resource information included within the sidelink message 440-*a* may be based on SCIs 415 which were received and processed prior to an end of a processing time interval at the first UE 115-*a* and/or processed prior to detection of the conflict 435. Conversely, the time and frequency resource information may not include resource information associated with SCIs 415 which were not received and/or processed prior to an end of the processing time interval.

For example, the UE 115 may receive and process the first SCI 415-*a* and the second SCI 415-*b* prior to an end of a processing time interval for the respective SCIs 415-*a*, 415-*b* and prior to detection of the conflict 435. Comparatively, the UE 115 may not have adequate time to process the third SCI 415-*c* prior to an end of the processing time interval and/or prior to detection of the conflict 435. In this example, the time and frequency resource information included within the sidelink message 440-*a* may be based on sidelink resource reservations made in the first SCI 415-*a* and the second SCI 415-*b*, but not based on sidelink resource reservations made in the third SCI 415-*c*. As such, the time and frequency resource information included within the sidelink message 440-*a* may indicate that sidelink resources associated with the first sidelink transmission 420-*a* and the second sidelink transmission 420-*b* are not available for future sidelink communications. Conversely, because the third SCI 415-*c* was not able to be processed prior to an end of the processing time interval and/or prior to detection of the conflict 435, the sidelink message 440-*a* may not include any information regarding the sidelink resources associated with the third sidelink transmission 420-*c*.

Subsequently, the UE 115 may transmit the sidelink message 440-*a* including the time and frequency resource information. The UE 115 may transmit the sidelink message 440-*a* based on (e.g., in accordance with) a reporting configuration. The UE 115 may transmit the sidelink message 440-*a* after an end of the preparation time interval 450. In some aspects, the UE 115 may transmit the sidelink message 440-*a* to the UEs 115 which performed and/or scheduled the sidelink communications associated with the conflict 435. In additional or alternative aspects, the UE 115 may transmit the sidelink message 440-*a* including the time and frequency resource information to other UEs 115 (e.g., neighboring UEs 115) within the wireless communications system. In this regard, the UE 115 may be configured to transmit the sidelink message 440-*a* via unicast techniques, groupcast/multicast techniques, broadcast techniques, or any combination thereof.

In some aspects, the sidelink message 340 may include an indication of the detected conflict 435. For example, the sidelink message 440-*a* may include a post-collision indicator, a half-duplex indicator, or other indicator which is associated with the detected conflict 435. In some aspects, the UE 115 may transmit the sidelink message 440-*a* in the same slot or TTI in which the conflict 435 was detected. For example, as shown in FIG. 4, the conflict 435 may be detected in a first slot 445-*a*, and the sidelink message 440-*a* may be transited in the first slot 445-*a*. In additional or alternative implementations, the sidelink message 440-*a* may be transmitted in a slot 445 subsequent to the first slot 445-*a*. For example, if the conflict 435 is detected at or near the end of the first slot 445-*a*, the UE 115 may transmit the sidelink message 440-*a* in the second slot 445-*b*.

According to some reporting configurations, the UE 115 may be configured to generate and transmit additional sidelink messages 440 (e.g., sidelink messages 440-*b*, 440-*n*) after transmission of the sidelink message 440-*a*. In some aspects, each additional sidelink message 440 may include updated time and frequency resource information associated with sidelink communications. In this regard, a second sidelink message 440-*b* may include updated time and frequency resource information which has been updated relative to the first sidelink message 440-*a*, and an nth sidelink message 440-*n* may include updated time and frequency resource information which has been updated relative to the second sidelink message 440-*b*.

For example, the second sidelink message 440-*b* may include updated time/frequency resource information which was not included within the first sidelink message 440-*a*. In particular, the second sidelink message 440-*b* may include time and frequency resource information associated with SCIs 415 received after detection of the conflict 435, SCIs 415 which were not able to be processed prior to an end of a processing time interval, SCIs 415 which were not able to be processed prior to detection of the conflict 435, or any combination thereof. For instance, in cases where the third SCI 415-*c* was not able to be processed prior to detection of the conflict 435 and/or prior to an end of a processing time interval, the time/frequency resource information included within the third SCI 415-*c* may not be included within the first sidelink message 440-*a*, but may be included within the second sidelink message 440-*b*. By way of another example, the second sidelink message 440-*b* may include updated time and frequency resource information associated with a fourth SCI 415-*d* and a fifth SCI 415-*e* which were received after detection of the conflict 435 and after transmission of the first sidelink message 440-*a*. Moreover, the nth sidelink message 440-*n* may include updated time and frequency resource information associated with a sixth SCI 415-*f* which was received after detection of the conflict 435 and after transmission of the second sidelink message 440-*b*.

The UE 115 may be configured to transmit the additional sidelink messages 440 based on (e.g., in accordance with) a reporting configuration. In particular, a reporting configuration may be associated with a periodicity 455 for transmitting sidelink messages 440 and/or a quantity of slots 460 across which sidelink messages 440 should be transmitted.

For instance, a second reporting configuration may configure the UE 115 to transmit sidelink messages 440 within every slot 445 (e.g., periodicity 455=one slot 445) for five total slots 445 (e.g., quantity of slots 460=five slots 445). following detection of a conflict 445. In this example, the UE 115 may transmit additional sidelink messages 440 including updated time and frequency resource information within every slot 445 for five total slots 445 (e.g., second slot 445-*b* through a sixth slot 445), in accordance with the second reporting configuration.

By way of another example, other reporting configurations may configure the UE 115 to transmit additional sidelink messages 440 according to a periodicity 455 for a defined quantity of slots 460. For instance, a third reporting configuration may configure the UE 115 to transmit additional sidelink messages 440 in every other slot 445 (e.g., periodicity 455=two slots 445) for a total of five slots 445 (e.g., quantity of slots 460=five slots 445) following detection of a conflict 435. In this example, the UE 115 may transmit a first additional sidelink message 440 within a third slot 445, and a second additional sidelink message 440 within a fifth slot 445. In this example, each sidelink message 440 may be separated by one slot (e.g., periodicity 455=two slots 445), in accordance with the third reporting configuration. The UE 115 may then refrain from transmitting additional sidelink messages 440 after the quantity of slots 460 associated with the third reporting configuration.

Figure 5:
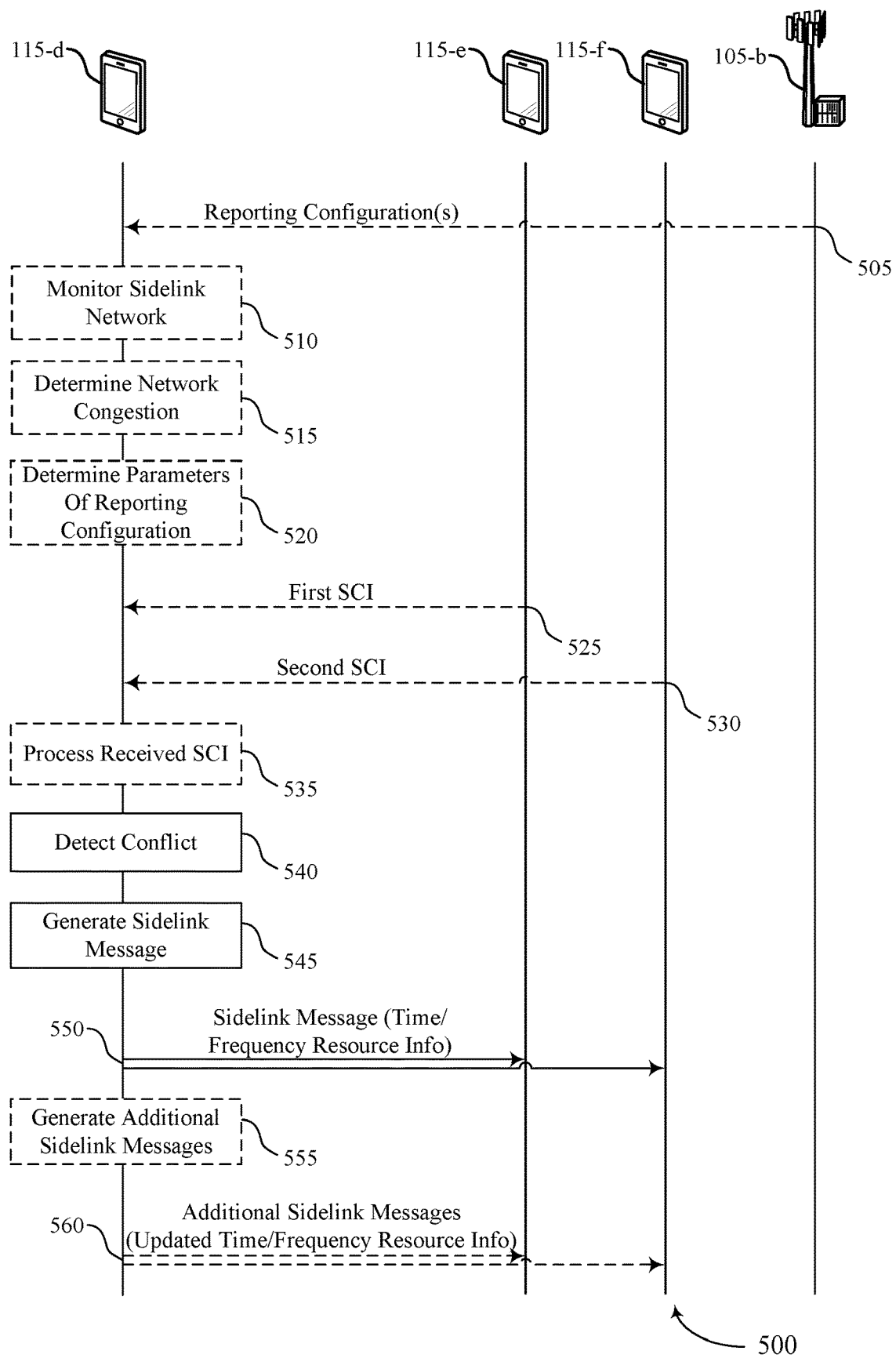
FIG. 5 illustrates an example of a process flow that supports techniques for sidelink resource information forwarding in accordance with aspects of the present disclosure.

FIG. 5 illustrates an example of a process flow 500 that supports techniques for sidelink resource information forwarding in accordance with aspects of the present disclosure. In some examples, process flow 00 may implement, or be implemented by, aspects of wireless communications systems 100, wireless communications systems 200, resource configuration 300, resource configuration 400, or any combination thereof. For example, the process flow 500 may illustrate a first UE 115-*d* detecting a conflict of sidelink communications, and transmitting time/frequency resource information for sidelink communications in accordance with a reporting configuration upon detecting the conflict, as described with reference to FIGS. 1-4.

In some cases, process flow 500 may include a first UE 115-*d*, a second UE 115-*e*, a third UE 115-*f*, and a base station 105-*b*, which may be examples of corresponding devices as described herein. For example, the first UE 115-*d*, the second UE 115-*e*, and the third UE 115-*f* illustrated in FIG. 5 may include examples of the first UE 115-*a*, the second UE 115-*b*, and the third UE 115-*c*, respectively, as illustrated in FIG. 2. Similarly, the base station 105-*b* illustrated in FIG. 5 may include an example of the base station 105-*a* illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the first UE 115-*d* may receive one or more reporting configurations for transmitting sidelink messages including time/frequency resource information for sidelink communications. The first UE 115-*d* may receive the indication of the one or more reporting configurations from the base station 105-*b*, another wireless device (e.g., another UE 115), or both. In some cases, the indication of the one or more reporting configurations may be conveyed via an RRC message, a DCI message, an SSB message, a SIB message, an SCI message, or any combination thereof.

In some aspects, the one or more reporting configurations may include one or more parameters or characteristics for transmitting (e.g., forwarding) sidelink messages including time/frequency resource information for sidelink communications. Parameters associated with a reporting configuration may include, but are not limited to, characteristics or rules for detecting a conflict of sidelink communications, a quantity of slots for transmitting sidelink messages including time/frequency resource information, a periodicity for transmitting sidelink messages including time/frequency resource information, and the like. For instance, a reporting configuration may indicate that the first UE 115-*d* is to transmit time/frequency resource information for a defined quantity of slots after detecting a sidelink conflict, according to a periodicity (e.g., every slot, every other slot) following a detected conflict, or any combination thereof.

Additionally or alternatively, a reporting configuration may be associated with a set of rules or other parameters which may be used by the first UE 115-*d* to determine parameters/characteristics of the respective reporting configuration. In this regard, the first UE 115-*d* may be configured with one or more reporting configurations which may control when and/or how often the first UE 115-*d* is to transmit (e.g., relay, forward) sidelink messages including time/frequency resource information for sidelink communications.

At 510, the first UE 115-*d* may monitor a sidelink network. The first UE 115-*d* may monitor the sidelink network at 510 based on receiving the one or more reporting configurations at 505. In some aspects, the first UE 115-*d* may monitor the sidelink network by decoding (e.g., blindly decoding) sidelink communications performed over the sidelink network. For example, the first UE 115-*d* may monitor the sidelink network by blindly decoding sidelink communications which are sensed within a PSCCH and/or PSSCH of the sidelink network. The first UE 115-*d* may monitor the sidelink network in order to identify sidelink resources which have been reserved by the second UE 115-*e* and/or the third UE 115-*f*, to determine characteristics associated with the sidelink network, or any combination thereof.

At 515, the first UE 115-*d* may determine a network congestion of the sidelink network. The first UE 115-*d* may determine the network congestion at 515 based on receiving the reporting configurations at 505, monitoring the sidelink network at 510, or both. For example, in cases where the first UE 115-*d* identifies large quantities of sidelink communications performed over the sidelink network, the first UE 115-*d* may be configured to determine that the sidelink network is associated with relatively high network congestion. Comparatively, in cases where the first UE 115-*d* identifies small quantities of sidelink communications performed over the sidelink network, the first UE 115-*d* may be configured to determine that the sidelink network is associated with relatively low network congestion.

At 520, the first UE 115-*d* may determine one or more parameters or characteristics associated with transmitting/forwarding time/frequency resource information associated with sidelink communications. In this regard, the first UE 115-*d* may determine one or more parameters or characteristics associated with a reporting configuration which was indicated at 505. As such, the first UE 115-*d* may determine the one or more parameters at 520 based on receiving the reporting configurations at 505, monitoring the sidelink network at 510, determining the network congestion at 520, or any combination thereof.

Additionally or alternatively, as noted previously herein, parameters for transmitting sidelink messages including time/frequency resource information (e.g., quantities of slots for transmitting sidelink messages, periodicity of sidelink messages) may be indicated via the reporting configurations at 505.

At 525, the first UE 115-*d* may receive a first SCI from the second UE 115-*e*. In some cases, the first UE 115-*d* may receive the first SCI at 525 based on monitoring the sidelink network at 510. The first SCI may be received via a PSCCH, a PSSCH, or both. In some aspects, the first SCI may reserve a first set of sidelink resources for a first sidelink communication to be performed at the second UE 115-*e*. In other words, the first SCI may schedule a first sidelink communication. For example, the first SCI may reserve a first set of sidelink resources for transmitting a first sidelink communication (e.g., PSSCH transmission) to the first UE 115-*d*, the third UE 115-*f*, or both. Accordingly, the second UE 115-*e* may transmit the first SCI scheduling the first sidelink communication based on the sidelink network being operated according to a Mode 2, as described previously herein. The second UE 115-*e* may transmit the first SCI via unicast techniques, multicast/groupcast techniques, broadcast techniques, or any combination thereof.

At 530, the first UE 115-*d* may receive a second SCI from the third UE 115-*f*. In some cases, the first UE 115-*d* may receive the second SCI at 530 based on monitoring the sidelink network at 510. The second SCI may be received via a PSCCH, a PSSCH, or both. In some aspects, the second SCI may reserve a second set of sidelink resources for a second sidelink communication to be performed at the third UE 115-*f*. In other words, the second SCI may schedule a second sidelink communication. For example, the second SCI may reserve a second set of sidelink resources for transmitting a second sidelink communication (e.g., PSSCH transmission) to the first UE 115-*d*, the second UE 115-*e*, or both. Accordingly, the third UE 115-*f* may transmit the second SCI scheduling the second sidelink communication based on the sidelink network being operated according to a Mode 2, as described previously herein. The third UE 115-*f* may transmit the first SCI via unicast techniques, multicast/groupcast techniques, broadcast techniques, or any combination thereof.

In cases where the first SCI and the second SCI transmitted at 525 and 530, respectively, schedule sidelink communications, the sets of resources reserved for the respective communications may be in conflict with one another. For example, a conflict may arise when a first set of sidelink resources reserved by the first SCI and a second set of sidelink resources reserved by the second SCI at least partially overlap in the time domain and the frequency domain.

At 535, the first UE 115-*d* may process (e.g., demodulate, decode) the first SCI received at 525, the second SCI received at 530, or both. The first UE 115-*d* may process any quantity of SCIs received from any quantity of UEs 115, including the second and third UEs 115-*e* and 115-*f*.

In some aspects, processing of the received SCIs may be associated with a processing time interval of the first UE 115-*d*. The processing time interval may be associated with (e.g., define) a time interval in which the first UE 115-*d* is capable of receiving and decoding the data included within received SCIs and/or other communications (e.g., PSCCH processing time). Accordingly, the first UE 115-*d* may process (e.g., demodulate, decode) the received SCIs during (e.g., within) a processing time interval associated with the first UE 115-*d*. In some aspects, a duration of the processing time interval may be based on a processing power or processing capability at the first UE 115-*d*.

At 540, the first UE 115-*d* may detect a conflict between multiple sidelink transmissions. In some aspects, the conflict may arise from at least partial overlap of multiple sidelink transmissions which are transmitted, or scheduled to be transmitted, by two or more other UEs 115 (e.g., second UE 115-*e*, third UE 115-*f*). The first UE 115-*d* may detect the conflict of sidelink communications at 540 based on receiving the reporting configurations at 505, monitoring the sidelink network at 510, determining network congestion at 515, determining parameters of the reporting configuration at 520, receiving the first SCI at 525, receiving the second SCI at 530, processing the received SCI at 535, or any combination thereof.

The first UE 115-*d* may be configured to detect a conflict between sidelink communications based on actually receiving conflicting (e.g., colliding) sidelink communications, identifying an overlap of reserved sidelink resources which are reserved for future sidelink communications, or both. For example, in some cases, the first UE 115-*d* may detect a conflict by receiving at least two sidelink transmissions from two or more other UEs 115 on overlapping time and frequency resources. For instance, the first UE 115-*d* may receive a first sidelink transmission from the second UE 115-*e* and may receive a second sidelink transmission from the third UE 115-*f*. In this example, the first UE 115-*d* may detect a conflict based on the first sidelink transmission and the second sidelink transmission being received in at least partially overlapping time and frequency resources. In this example, because the first and second sidelink transmissions are transmitted/received using overlapping time and frequency resources, the sidelink transmissions may be said to be in conflict due to the fact that the first and second sidelink transmissions may "collide" with one another at the first UE 115-*d*. Similarly, in the case of a half-duplex conflict, the first UE 115-*d* may detect a conflict based on receiving the first sidelink transmission from the second UE 115-*d* and the second sidelink transmission from the third UE 115-*f* concurrently (e.g., at the same time).

In additional or other cases, the first UE 115-*d* may detect a conflict based on the reservation of sidelink resources for future sidelink communications. In this regard, the first UE 115-*d* may detect a conflict based on receiving an indication that at least two sidelink transmissions from other UEs 115 are scheduled to at least partially overlap in time and frequency resources. For example, as noted previously herein, the first SCI received from the second UE 115-*e* at 525 may schedule a first sidelink transmission to be transmitted by the second UE 115-*e* using a first set of sidelink resources. Similarly, the second SCI received from the third UE 115-*f* at 530 may schedule a second sidelink transmission to be transmitted by the third UE 115-*f* using a second set of sidelink resources. In this example, the first UE 115-*d* may detect a conflict based on determining that the first set of sidelink resources and the second set of sidelink resources at least partially overlap in the time and frequency domain. In other words, the first UE 115-*d* may detect the conflict based on determining that the first sidelink transmission and the second sidelink transmission are scheduled to overlap in time and frequency resources.

At 545, the first UE 115-*d* may generate a sidelink message. In particular, the first UE 115-*d* may generate a sidelink message based on the conflict detected at 540. In some aspects, the sidelink message may include time and frequency resource information associated with SCI which was received and processed by the first UE 115-*d* prior to detection of the conflict at 545. In this regard, the first UE 115-*d* may generate the sidelink message at 545 based on receiving the reporting configurations at 505, monitoring the sidelink network at 510, determining network congestion at 515, determining parameters of the reporting configuration at 520, receiving the first SCI at 525, receiving the second SCI at 530, processing the received SCI at 535, detecting the conflict at 540, or any combination thereof.

In some aspects, the first UE 115-*d* may generate the sidelink message including time and frequency resource information so that the sidelink message may be distributed to neighboring UEs 115 in order to inform neighboring UEs 115 as to which sidelink resource may or may not be used for future sidelink communications. As such, the first UE 115-*d* may generate the sidelink message at 545 in order to increase sidelink network coordination, and reduce or eliminate a likelihood of future conflicts between sidelink communications. For example, the time and frequency resource information included within the generated sidelink message may indicate a first set of sidelink resources which is available for subsequent sidelink communications, and a second set of sidelink resources which is not available for subsequent sidelink communications. In other words, time and frequency resource information may indicate sets of sidelink resources which have already been claimed or reserved by other UEs 115 for sidelink communications (e.g., sets of sidelink resources which are unavailable for future sidelink communications), and/or sets of sidelink resources which have not been previously claimed or reserved by other UEs 115 for sidelink communications (e.g., sets of sidelink resources which are available for future sidelink communications).

In some aspects, the first UE 115-*d* may generate the sidelink message during a preparation time interval (e.g., preparation time interval for generating/preparing sidelink messages). In some aspects, the preparation time interval (e.g., start of the preparation time interval) may be based on detection of the conflict at 540. For example, the preparation time interval may begin upon detection of the conflict. In other words, the first UE 115-*d* may begin generating the sidelink message at 545 following detection of the conflict at 540.

In some aspects, the time and frequency resource information included within the sidelink message may be based on SCIs (e.g., first SCI, second SCI) which were received and processed prior to an end of a processing time interval at the first UE 115-*d*. Conversely, the time and frequency resource information may not include resource information associated with SCIs which were not received and/or processed prior to an end of the processing time interval.

For example, the first UE 115-*d* may receive and process the first SCI and the second SCI received from the second UE 115-*e* and third UE 115-*f*, respectively, prior to an end of a processing time interval. Comparatively, the first UE 115-*d* may receive a third SCI from an additional UE 115, but may not have adequate time to process the third SCI prior to an end of the processing time interval and/or prior to detection of the conflict at 540. In this example, the time and frequency resource information included within the sidelink message may be based on sidelink resource reservations made in the first SCI and the second SCI, but not based on sidelink resource reservations made in the third SCI. In other words, according to some implementations, SCIs and other sidelink communications which reserve sidelink resources but are not able to be processed (e.g., decoded) at the first UE 115-*d* prior to an end of the processing time interval and/or prior to detection of the conflict may not be reflected in the time and frequency resource information within the sidelink message.

In some aspects, all or only a portion of data included within SCIs which were received and processed prior to detection of the conflict may be included within the sidelink message. For example, in some cases, the first UE 115-*d* may include all the data (e.g., all the time/frequency reservation data) included within the first SCI and the second SCI within the generated sidelink message. In such cases, the first UE 115-*d* may be configured to generate the sidelink message at 545 by packaging the first SCI and the second SCI into a new sidelink message which will be transmitted (e.g., forwarded, relayed) to other UEs 115. In other cases, the first UE 115-*d* may include only a portion of the data included within the first SCI and the second SCI within the generated sidelink message. For instance, in some cases, the sidelink message may include decoded data from the first and second SCIs.

At 550, the first UE 115-*d* may transmit the sidelink message including the time and frequency resource information. In some aspects, the first UE 115-*d* may transmit the sidelink message to the second UE 115-*e*, the third UE 115-*f*, or both. In additional or alternative aspects, the first UE 115-*d* may transmit the sidelink message including the time and frequency resource information to other UEs 115 (e.g., neighboring UEs 115) within the wireless communications system. In this regard, the first UE 115-*d* may be configured to transmit the sidelink message via unicast techniques, groupcast/multicast techniques, broadcast techniques, or any combination thereof.

The first UE 115-*d* may transmit the sidelink message at 550 based on receiving the reporting configurations at 505, monitoring the sidelink network at 510, determining network congestion at 515, determining parameters of the reporting configuration at 520, receiving the first SCI at 525, receiving the second SCI at 530, processing the received SCI at 535, detecting the conflict at 540, generating the sidelink message at 545, or any combination thereof. For example, the first UE 115-*d* may transmit the sidelink message in accordance with the reporting configuration received at 505. For instance, the reporting configuration may indicate a set of rules or parameters which indicate what time/frequency resource information is to be included within the sidelink message, a timing for transmitting the sidelink message, or both, and the first UE 115-*d* may transmit the sidelink message in accordance with the rules/parameters associated with the reporting configuration.

In some aspects, the sidelink message may include an indication of the detected conflict. For example, the sidelink message may include a post-collision indicator, a half-duplex indicator, or other indicator which is associated with the detected conflict. In some aspects, the first UE 115-*d* may transmit the sidelink message in the same slot or TTI in which the conflict was detected. Additionally or alternatively, the first UE 115-*d* may transmit the sidelink message in a TTI which follows the TTI in which the conflict was detected.

As noted previously herein, the first UE 115-*d* may distribute the sidelink message to neighboring UEs 115 (e.g., second UE 115-*e*, third UE 115-*f*) in order to inform neighboring UEs 115 as to potential future conflicts and/or to inform the neighboring UEs 115 which sidelink resource may or may not be used for future sidelink communications. As such, the first UE 115-*d* may transmit the sidelink message at 550 in order to increase sidelink network coordination, and reduce or eliminate a likelihood of future conflicts between sidelink communications. For example, the time and frequency resource information included within the generated sidelink message may indicate a first set of sidelink resources which is available for subsequent sidelink communications, and a second set of sidelink resources which is not available for subsequent sidelink communications. In other words, time and frequency resource information may indicate sets of sidelink resources which have already been claimed or reserved by other UEs 115 for sidelink communications (e.g., sets of sidelink resources which are unavailable for future sidelink communications), and/or sets of sidelink resources which have not been previously claimed or reserved by other UEs 115 for sidelink communications (e.g., sets of sidelink resources which are available for future sidelink communications).

In some cases, the sidelink message may include all of the information included within SCIs which were received/processed prior to detection of the conflict. For example, in some cases, the first UE 115-d may generate and/or transmit the sidelink message by forwarding the first SCI and/or the second SCI which was received and processed by the first UE 115-d prior to detection of the conflict. In additional or alternative cases, the sidelink message may include only a portion of the information included within SCIs which were received/processed prior to detection of the conflict.

The sidelink message may be transmitted via a sidelink control channel (e.g., PSCCH), a sidelink shared channel (e.g., PSSCH), a sidelink feedback channel (e.g., PSFCH), or any combination thereof. In some aspects, the sidelink message may be transmitted as its own sidelink communication (e.g., standalone PSCCH message and/or PSSCH message). In additional or alternative cases, the sidelink message may be combined with (e.g., multiplexed with, piggybacked with) other sidelink communications. For example, the first UE 115-d may multiplex the time and frequency resource information with another sidelink data message (e.g., multiples time and frequency resource information with a PSSCH transmission).

The first UE 115-d may determine to multiplex the time/frequency resource information with other sidelink data messages based on a relative timing of the other sidelink data messages and/or a relative increase in latency of the time/frequency resource information attributable to the multiplexing. For instance, if the next scheduled sidelink data transmission will increase the latency of the time/frequency resource information by more than some latency threshold, the first UE 115-d may determine to transmit the sidelink message including the time/frequency resource information as a standalone sidelink message. In some cases, the reporting configuration may indicate whether the sidelink message may be transmitted as a standalone message, or multiplexed with other sidelink communications.

At 555, the first UE 115-d may generate additional sidelink messages. In particular, the first UE 115-d may generate additional sidelink messages based on the conflict detected at 540. In some aspects, the additional sidelink messages may include updated time and frequency resource information associated with SCIs which were received and processed by the first UE 115-d after to detection of the conflict at 545. In this regard, the first UE 115-d may generate the additional sidelink messages at 555 based on receiving the reporting configurations at 505, monitoring the sidelink network at 510, determining network congestion at 515, determining parameters of the reporting configuration at 520, receiving the first SCI at 525, receiving the second SCI at 530, processing the received SCI at 535, detecting the conflict at 540, generating the sidelink message at 545, transmitting the sidelink message at 550, or any combination thereof.

In some aspects, the updated time and frequency resource information within the additional sidelink messages generated at 555 may be updated relative to the time and frequency information included within the sidelink message generated and transmitted at 545 and 550. In this regard, the updated time and frequency resource information may be based on SCIs which were received after generation of the sidelink message at 545, SCIs which were received but not processed prior to detection of the conflict at 540, or both.

For example, as noted previously herein, the first UE 115-d may receive and process the first SCI and the second SCI received from the second UE 115-e and third UE 115-f, respectively, prior to detection of the conflict at 540. Comparatively, the first UE 115-d may receive a third SCI from an additional UE 115, but may not have adequate time to process the third SCI prior to detection of the conflict at 540. In this example, the updated time and frequency resource information included within the additional sidelink messages may be based on the third SCI. By way of another example, the updated time and frequency resource information may be based on SCIs which were received after detection of the conflict at 540.

In some aspects the first UE 115-d may generate (or refrain from generating) the additional sidelink messages based on (e.g., in accordance with) the reporting configuration. For example, a first reporting configuration may cause the first UE 115-d to transmit only a single sidelink message including time and frequency resource information upon detection of a conflict. In this example, the first UE 115-d may refrain from generating the additional sidelink messages based on (e.g., in accordance with) the first reporting configuration.

Comparatively, other reporting configurations may cause the first UE 115-d to transmit multiple sidelink messages including time and frequency resource information upon detection of a conflict. For example, a second reporting configuration may cause the first UE 115-d to generate/transmit additional sidelink messages including updated time/frequency resource information within every slot for a predetermined quantity of slots following detection of a conflict. In such cases, the first UE 115-d may generate the additional sidelink messages at 555 in accordance with the second reporting configuration. In particular, the first UE 115-d may generate the additional sidelink messages at 555 within every slot for a predetermined quantity of slots following detection of the conflict in accordance with the second reporting configuration. In this example, each additional sidelink message may include updated time/frequency resource information, which has been updated relative to the preceding sidelink message.

By way of another example, a third reporting configuration may cause the first UE 115-d to generate/transmit additional sidelink messages including updated time/frequency resource information in accordance with a periodicity (e.g., every n slots) for a predetermined quantity of slots following detection of a conflict. In such cases, the first UE 115-d may generate the additional sidelink messages at 555 in accordance with the periodicity for the predetermined quantity of slots associated with the third reporting configuration. For instance, the third reporting configuration may cause the first UE 115-d to transmit sidelink messages every other slot (e.g., periodicity of two slots) for a total of six slots (e.g., quantity of slots=6). In such cases, the first UE 115-d may generate a first additional sidelink message two slots after detection of the conflict and/or transmission of the first sidelink message. Similarly, continuing with the same example, the first UE 115-d may generate a second additional sidelink message and a third additional sidelink message four and six slots after detection of the conflict and/or transmission of the first sidelink message, respectively. In this example, each additional sidelink message may include updated time/frequency resource information which has been updated relative to the preceding sidelink message.

At 560, the first UE 115-*d* may transmit the additional sidelink messages including the updated time and frequency resource information. In some aspects, the first UE 115-*d* may transmit the additional sidelink message to the second UE 115-*e*, the third UE 115-*f*, or both. In additional or alternative aspects, the first UE 115-*d* may transmit the additional sidelink messages including the updated time and frequency resource information to other UEs 115 (e.g., neighboring UEs 115) within the wireless communications system. In this regard, the first UE 115-*d* may be configured to transmit the additional sidelink messages via unicast techniques, groupcast/multicast techniques, broadcast techniques, or any combination thereof.

The first UE 115-*d* may transmit the additional sidelink messages at 550 based on receiving the reporting configurations at 505, monitoring the sidelink network at 510, determining network congestion at 515, determining parameters of the reporting configuration at 520, receiving the first SCI at 525, receiving the second SCI at 530, processing the received SCI at 535, detecting the conflict at 540, generating the sidelink message at 545, transmitting the sidelink message at 550, generating the additional sidelink messages at 555, or any combination thereof.

For example, the first UE 115-*d* may transmit the sidelink message in accordance with the reporting configuration received at 505. For instance, a second reporting configuration may indicate for the first UE 115-*d* to transmit additional sidelink messages within every slot for a predetermined quantity of slots, and the first UE 115-*d* may transmit the additional sidelink messages in accordance with the second reporting configuration. By way of another example, a third reporting configuration may indicate for the first UE 115-*d* to transmit additional sidelink messages in accordance with a periodicity (e.g., every n slots) for a predetermined quantity of slots, and the first UE 115-*d* may transmit the additional sidelink messages in accordance with the third reporting configuration.

Techniques described herein may improve sidelink network coordination to reduce sidelink conflicts while preventing significant increases in signaling overhead. In particular, techniques described herein may enable the first UE 115-*d* to transmit (e.g., forward, relay) sidelink time/frequency resource information according to one or more reporting configurations upon identifying a conflict in sidelink communications. By transmitting time/frequency resource information in accordance with reporting configurations, techniques described herein may reduce or eliminate sidelink conflicts during Mode 2 sidelink operation, thereby improving an efficiency and reliability of sidelink communications.

Figure 6:
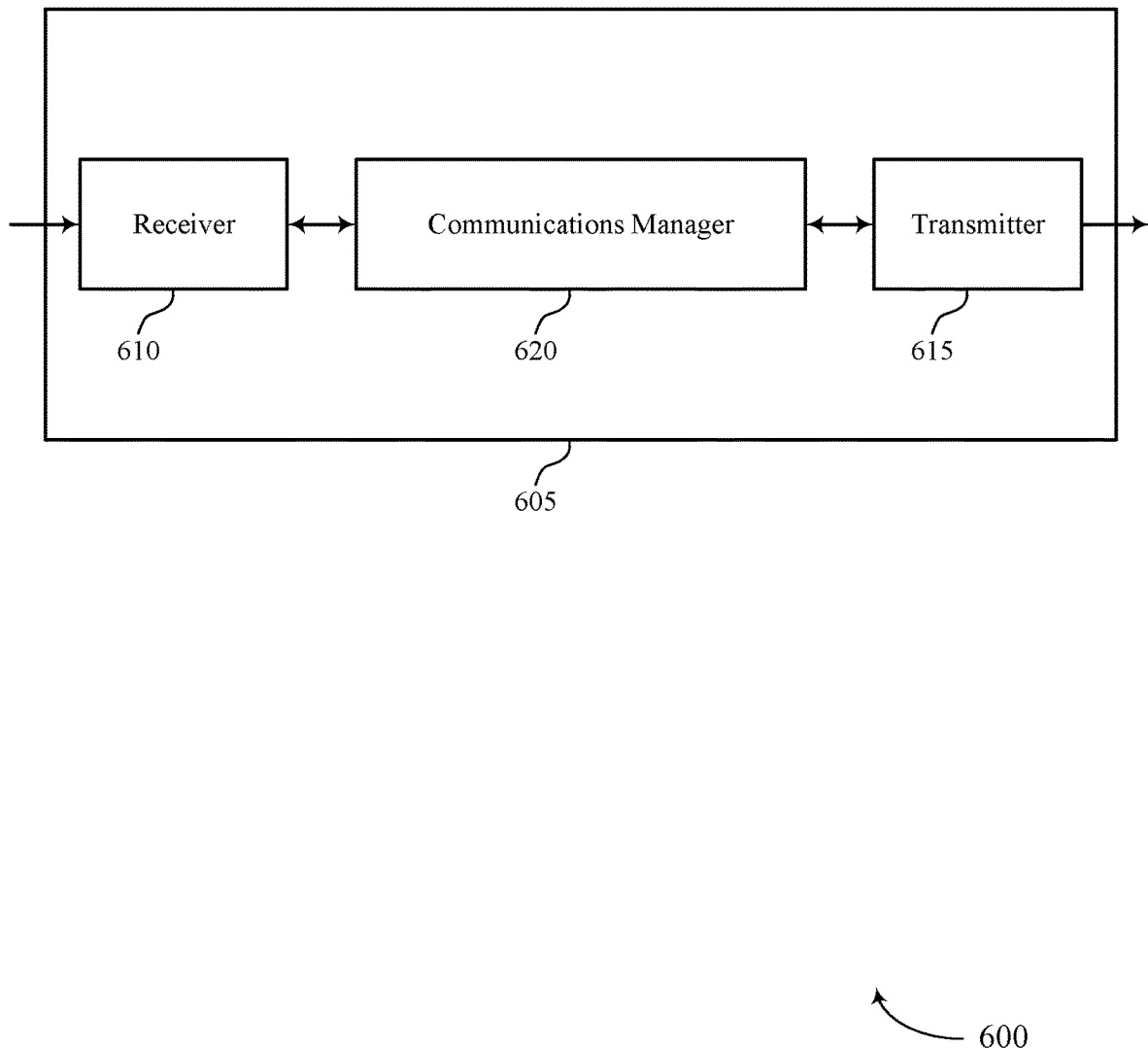
FIGS. 6 and 7 show block diagrams of devices that support techniques for sidelink resource information forwarding in accordance with aspects of the present disclosure.

FIG. 6 shows a block diagram 600 of a device 605 that supports techniques for sidelink resource information forwarding in accordance with aspects of the present disclosure. The device 605 may be an example of aspects of a base station 105 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sidelink resource information forwarding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sidelink resource information forwarding). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for sidelink resource information forwarding as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for triggering a sidelink message to one or more UE of a set of multiple other UEs. The communications manager 620 may be configured as or otherwise support a means for generating the sidelink message based on the triggering, the sidelink message including time and frequency resource information associated with sidelink control information received and processed by the first UE. The communications manager 620 may be configured as or otherwise support a means for multiplexing the sidelink message with a sidelink data message. The communications manager 620 may be configured as or otherwise support a means for transmitting the sidelink message multiplexed with the sidelink data message to the one or more UE of the set of multiple other UEs. In another example, the communications manager 620 may be configured as or otherwise support a means for detecting a conflict arising from at least partial overlap of sidelink communications transmitted or scheduled to be transmitted by a set of multiple other UEs. The communications manager 620 may be configured as or otherwise support a means for generating a sidelink message based on the detected conflict, the sidelink message including time and frequency resource information associated with SCI received and processed by the first UE prior to detection of the conflict. The communications manager 620 may be configured as or otherwise support a means for transmitting the sidelink message to one or more of the set of multiple other UEs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved sidelink network coordination to reduce sidelink conflicts while preventing significant increases in signaling overhead. In particular, techniques described herein may enable UEs 115 to transmit (e.g., forward, relay) sidelink time/frequency resource information according to one or more reporting configurations upon identifying a conflict in sidelink communications. By transmitting time/frequency resource information in accordance with reporting configurations, techniques described herein may reduce or eliminate sidelink conflicts during Mode 2 sidelink operation, thereby improving an efficiency and reliability of sidelink communications.

Figure 7:
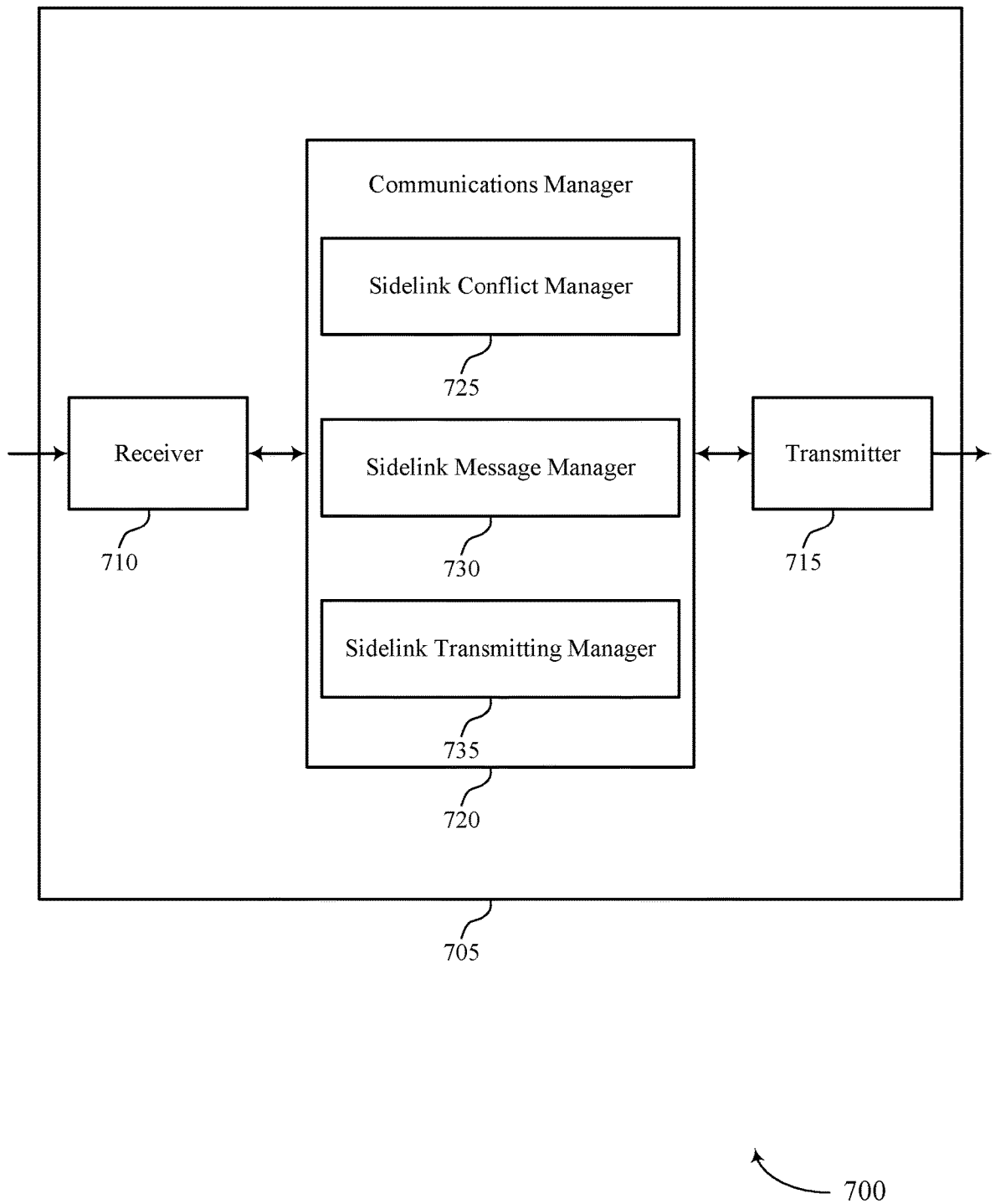

FIG. 7 shows a block diagram 700 of a device 705 that supports techniques for sidelink resource information forwarding in accordance with aspects of the present disclosure. The device 705 may be an example of aspects of a device 605, a base station 105, or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for sidelink resource information forwarding). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for sidelink resource information forwarding). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for sidelink resource information forwarding as described herein. For example, the communications manager 720 may include a sidelink conflict manager 725, a sidelink message manager 730, a sidelink transmitting manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The sidelink conflict manager 725 may be configured as or otherwise support a means for triggering a sidelink message to one or more UE of a set of multiple other UEs. The sidelink message manager 730 may be configured as or otherwise support a means for generating the sidelink message based on the triggering, the sidelink message including time and frequency resource information associated with sidelink control information received and processed by the first UE. The sidelink message manager 730 may be configured as or otherwise support a means for multiplexing the sidelink message with a sidelink data message. The sidelink transmitting manager 735 may be configured as or otherwise support a means for transmitting the sidelink message multiplexed with the sidelink data message to the one or more UE of the set of multiple other UEs. In some examples, the sidelink conflict manager 725 may be configured as or otherwise support a means for detecting a conflict arising from at least partial overlap of sidelink communications transmitted or scheduled to be transmitted by a set of multiple other UEs. The sidelink message manager 730 may be configured as or otherwise support a means for generating a sidelink message based on the detected conflict, the sidelink message including time and frequency resource information associated with SCI received and processed by the first UE prior to detection of the conflict. The sidelink transmitting manager 735 may be configured as or otherwise support a means for transmitting the sidelink message to one or more of the set of multiple other UEs.

Figure 8:
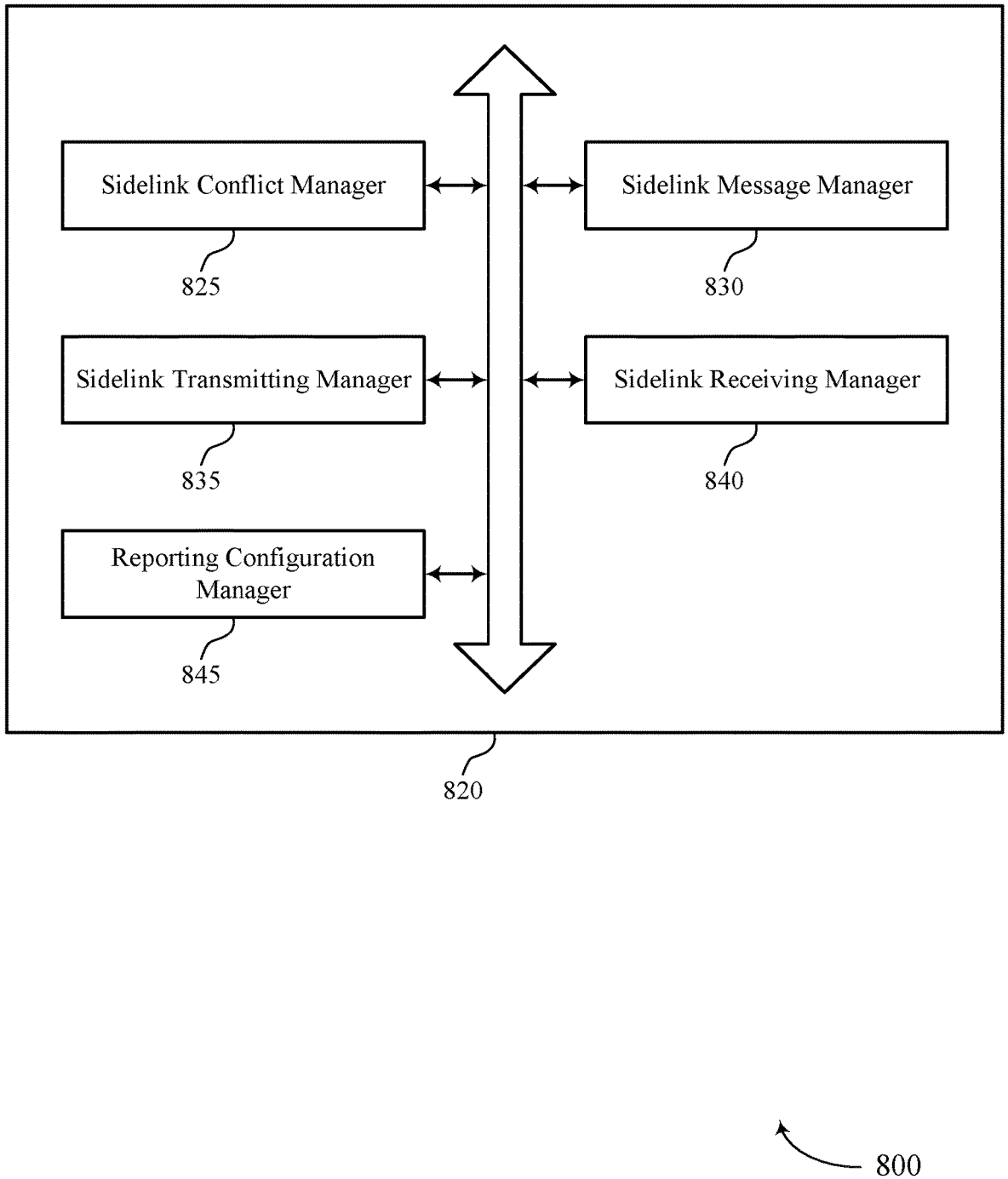
FIG. 8 shows a block diagram of a communications manager that supports techniques for sidelink resource information forwarding in accordance with aspects of the present disclosure.

FIG. 8 shows a block diagram 800 of a communications manager 820 that supports techniques for sidelink resource information forwarding in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for sidelink resource information forwarding as described herein. For example, the communications manager 820 may include a sidelink conflict manager 825, a sidelink message manager 830, a sidelink transmitting manager 835, a sidelink receiving manager 840, a reporting configuration manager 845, or any combination thereof. Each of these components may communicate, directly or indirectly, with one another (e.g., via one or more buses).

The communications manager 820 may support wireless communication at a first UE in accordance with examples as disclosed herein. The sidelink conflict manager 825 may be configured as or otherwise support a means for triggering a sidelink message to one or more UE of a set of multiple other UEs. The sidelink message manager 830 may be configured as or otherwise support a means for generating the sidelink message based on the triggering, the sidelink message including time and frequency resource information associated with sidelink control information received and processed by the first UE. In some examples, the sidelink message manager 830 may be configured as or otherwise support a means for multiplexing the sidelink message with a sidelink data message. The sidelink transmitting manager 835 may be configured as or otherwise support a means for transmitting the sidelink message multiplexed with the sidelink data message to the one or more UE of the set of multiple other UEs. In some examples, the sidelink conflict manager 825 may be configured as or otherwise support a means for detecting a conflict arising from at least partial overlap of sidelink communications transmitted or scheduled to be transmitted by a set of multiple other UEs. The sidelink message manager 830 may be configured as or otherwise support a means for generating a sidelink message based on the detected conflict, the sidelink message including time and frequency resource information associated with SCI received and processed by the first UE prior to detection of the conflict. The sidelink transmitting manager 835 may be configured as or otherwise support a means for transmitting the sidelink message to one or more of the set of multiple other UEs.

In some examples, to support triggering the sidelink message, the sidelink conflict manager 825 may be configured as or otherwise support a means for detecting a conflict arising from at least partial overlap of sidelink communications transmitted or scheduled to be transmitted by the set of multiple other UEs. In some examples, to support detecting the conflict, the sidelink conflict manager 825 may be configured as or otherwise support a means for receiving at least two sidelink transmissions from the set of multiple other UEs on overlapping time and frequency resources. In some examples, to support detecting the conflict, the sidelink conflict manager 825 may be configured as or otherwise support a means for receiving an indication that at least two sidelink transmissions from the set of multiple other UEs are scheduled to overlap in time and frequency resources. In some examples, to support detecting the conflict, the sidelink conflict manager 825 may be configured as or otherwise support a means for receiving at least two sidelink transmissions from the set of multiple other UEs at a same time.

In some examples, the sidelink message multiplexed with the sidelink data message is transmitted in a first slot, and the sidelink message manager 830 may be configured as or otherwise support a means for generating additional sidelink messages based on the triggering the sidelink message, the additional sidelink messages including updated time and frequency resource information associated with additional sidelink control information received and processed by the first UE after the triggering the sidelink message. In some examples, the sidelink message multiplexed with the sidelink data message is transmitted in a first slot, and the sidelink transmitting manager 835 may be configured as or otherwise support a means for transmitting the additional sidelink messages according to a periodicity for a quantity of slots. In some examples, the periodicity is every slot during the quantity of slots.

In some examples, the sidelink receiving manager 845 may be configured as or otherwise support a means for receiving an indication of the quantity of slots, the periodicity, or both, where the first UE transmits the additional sidelink messages based on receiving the indication of the quantity of slots, the periodicity, or both.

In some examples, the reporting configuration manager 840 may be configured as or otherwise support a means for determining the quantity of slots, the periodicity, or both, based on network congestion, where the first UE transmits the additional sidelink messages based on determining the quantity of slots, the periodicity, or both.

In some examples, the time and frequency resource information included in the sidelink message is based on the sidelink control information received and processed by the first UE prior to an end of a processing time interval.

In some examples, the sidelink transmitting manager 835 may be configured as or otherwise support a means for transmitting, via the sidelink message, an indication of the triggering the sidelink message.

In some examples, the sidelink message manager 830 may be configured as or otherwise support a means for generating the sidelink message during a preparation time interval, where a start of the preparation time interval is based on the triggering the sidelink message.

In some examples, the reporting configuration manager 840 may be configured as or otherwise support a means for receiving a reporting configuration for transmission of the sidelink message, where the sidelink message multiplexed with the sidelink data message is transmitted in accordance with the reporting configuration.

In some examples, to support generating the sidelink message, the sidelink message manager 830 may be configured as or otherwise support a means for preparing the sidelink control information received and processed by the first UE for forwarding.

In some examples, the time and frequency resource information associated with the sidelink control information indicates a first set of sidelink resources which is available for subsequent sidelink communications, a second set of sidelink resources which is not available for subsequent sidelink communications, or both.

In some examples, the sidelink message multiplexed with the sidelink data message is transmitted via a sidelink control channel, a sidelink shared channel, a sidelink feedback channel, or any combination thereof.

In some examples, the sidelink message is transmitted in a first slot, and the sidelink message manager 830 may be configured as or otherwise support a means for generating additional sidelink messages based on the detected conflict, the additional sidelink messages including updated time and frequency resource information associated with additional SCI received and processed by the first UE after detection of the conflict. In some examples, the sidelink message is transmitted in a first slot, and the sidelink transmitting manager 835 may be configured as or otherwise support a means for transmitting the additional sidelink messages according to a periodicity for a quantity of slots. In some examples, the periodicity is every slot during the quantity of slots.

In some examples, the reporting configuration manager 845 may be configured as or otherwise support a means for receiving an indication of the quantity of slots, the periodicity, or both, where the first UE transmits the additional sidelink messages based on receiving the indication of the quantity of slots, the periodicity, or both. In some examples, the reporting configuration manager 845 may be configured as or otherwise support a means for determining the quantity of slots, the periodicity, or both, based on network congestion, where the first UE transmits the additional sidelink messages based on determining the quantity of slots, the periodicity, or both. In some examples, the time and frequency resource information included in the sidelink message is based on the additional SCI received and processed by the first UE prior to an end of a processing time interval.

In some examples, the sidelink transmitting manager 835 may be configured as or otherwise support a means for transmitting, via the sidelink message, an indication of the detected conflict.

In some examples, the sidelink message manager 830 may be configured as or otherwise support a means for generating the sidelink message during a preparation time interval, where a start of the preparation time interval is based on detection of the conflict.

In some examples, to support detecting the conflict, the sidelink receiving manager 840 may be configured as or otherwise support a means for receiving at least two sidelink transmissions from the set of multiple other UEs on overlapping time and frequency resources. In some examples, to support detecting the conflict, the sidelink receiving manager 840 may be configured as or otherwise support a means for receiving an indication that at least two sidelink transmissions from the set of multiple other UEs are scheduled to overlap in time and frequency resources. In some examples, to support detecting the conflict, the sidelink receiving manager 840 may be configured as or otherwise support a means for receiving at least two sidelink transmissions from the set of multiple other UEs at the same time.

In some examples, the reporting configuration manager 845 may be configured as or otherwise support a means for receiving a reporting configuration for transmission of the sidelink message, where the sidelink message is transmitted in accordance with the reporting configuration.

In some examples, to support generating the sidelink message, transmitting the sidelink message, or both, the sidelink transmitting manager 835 may be configured as or otherwise support a means for forwarding the SCI received and processed by the first UE. In some examples, the time and frequency resource information associated with the SCI indicates a first set of sidelink resources which is available for subsequent sidelink communications, a second set of sidelink resources which is not available for subsequent sidelink communications, or both.

In some examples, to support generating the sidelink message, the sidelink transmitting manager 835 may be configured as or otherwise support a means for multiplexing the time and frequency resource information with a sidelink data message, where transmitting the sidelink message is based on the multiplexing. In some examples, the sidelink message is transmitted via a sidelink control channel, a sidelink shared channel, a sidelink feedback channel, or any combination thereof.

Figure 9:
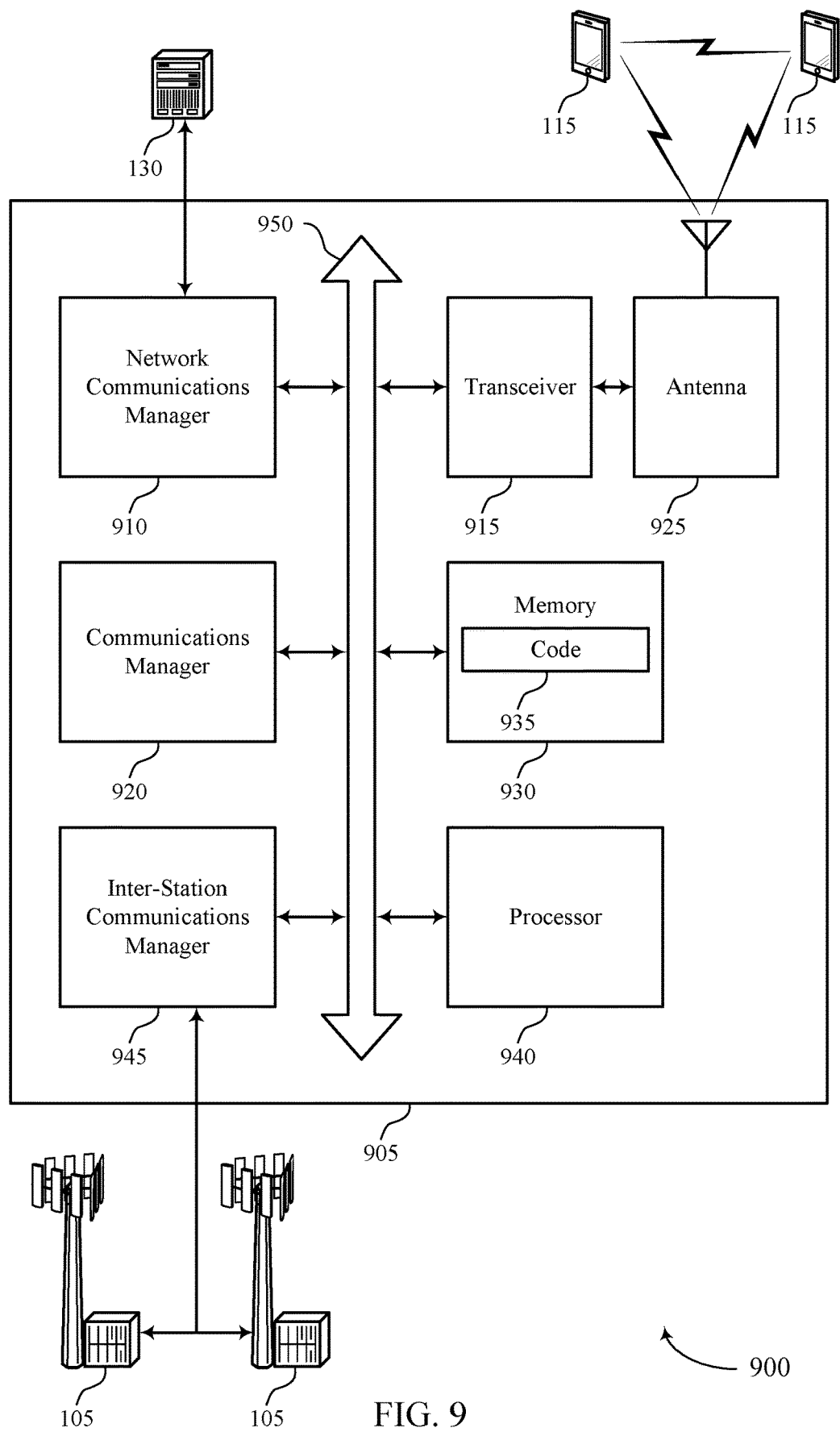
FIG. 9 shows a diagram of a system including a device that supports techniques for sidelink resource information forwarding in accordance with aspects of the present disclosure.

FIG. 9 shows a diagram of a system 900 including a device 905 that supports techniques for sidelink resource information forwarding in accordance with aspects of the present disclosure. The device 905 may be an example of or include the components of a device 605, a device 705, a base station 105, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random-access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic IO system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for sidelink resource information forwarding). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a first UE in accordance with examples as disclosed herein. For example, the communications manager 920 may be configured as or otherwise support a means for triggering a sidelink message to one or more UE of a set of multiple other UEs. The communications manager 920 may be configured as or otherwise support a means for generating the sidelink message based on the triggering, the sidelink message including time and frequency resource information associated with sidelink control information received and processed by the first UE. The communications manager 920 may be configured as or otherwise support a means for multiplexing the sidelink message with a sidelink data message. The communications manager 920 may be configured as or otherwise support a means for transmitting the sidelink message multiplexed with the sidelink data message to the one or more UE of the set of multiple other UEs. In another example, the communications manager 920 may be configured as or otherwise support a means for detecting a conflict arising from at least partial overlap of sidelink communications transmitted or scheduled to be transmitted by a set of multiple other UEs. The communications manager 920 may be configured as or otherwise support a means for generating a sidelink message based on the detected conflict, the sidelink message including time and frequency resource information associated with SCI received and processed by the first UE prior to detection of the conflict. The communications manager 920 may be configured as or otherwise support a means for transmitting the sidelink message to one or more of the set of multiple other UEs.

By including or configuring the communications manager 920 in accordance with examples as described herein, the device 905 may support techniques for improved sidelink network coordination to reduce sidelink conflicts while preventing significant increases in signaling overhead. In particular, techniques described herein may enable UEs 115 to transmit (e.g., forward, relay) sidelink time/frequency resource information according to one or more reporting configurations upon identifying a conflict in sidelink communications. By transmitting time/frequency resource information in accordance with reporting configurations, techniques described herein may reduce or eliminate sidelink conflicts during Mode 2 sidelink operation, thereby improving an efficiency and reliability of sidelink communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for sidelink resource information forwarding as described herein, or the processor 940 and the memory 930 may be otherwise configured to perform or support such operations.

Figure 10:
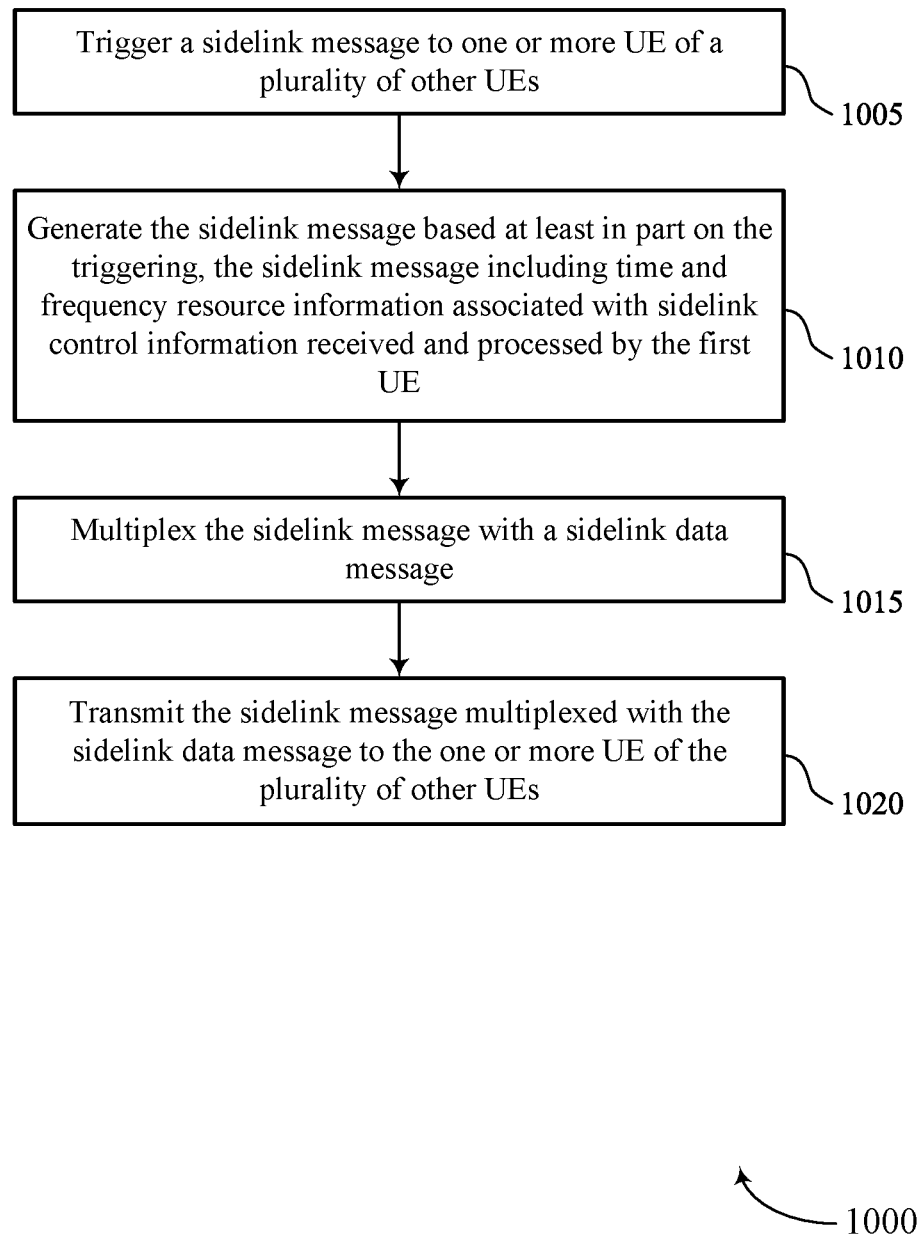
FIGS. 10 through 13 show flowcharts illustrating methods that support techniques for sidelink resource information forwarding in accordance with aspects of the present disclosure.

FIG. 10 shows a flowchart illustrating a method 1000 that supports techniques for sidelink resource information forwarding in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include triggering a sidelink message to one or more UE of a set of multiple other UEs. The operations of 1005 may be performed in accordance with examples as disclosed herein. In some examples, aspects of the operations of 1005 may be performed by a sidelink conflict manager 825 as described with reference to FIG. 8.

At 1010, the method may include generating the sidelink message based on the triggering, the sidelink message including time and frequency resource information associated with sidelink control information received and processed by the first UE. The operations of 1010 may be performed in accordance with examples as disclosed herein. In some examples, aspects of the operations of 1010 may be performed by a sidelink message manager 830 as described with reference to FIG. 8.

At 1015, the method may include multiplexing the sidelink message with a sidelink data message. The operations of 1015 may be performed in accordance with examples as disclosed herein. In some examples, aspects of the operations of 1015 may be performed by a sidelink message manager 830 as described with reference to FIG. 8.

At 1020, the method may include transmitting the sidelink message multiplexed with the sidelink data message to the one or more UE of the set of multiple other UEs. The operations of 1020 may be performed in accordance with examples as disclosed herein. In some examples, aspects of the operations of 1020 may be performed by a sidelink transmitting manager 835 as described with reference to FIG. 8.

Figure 11:
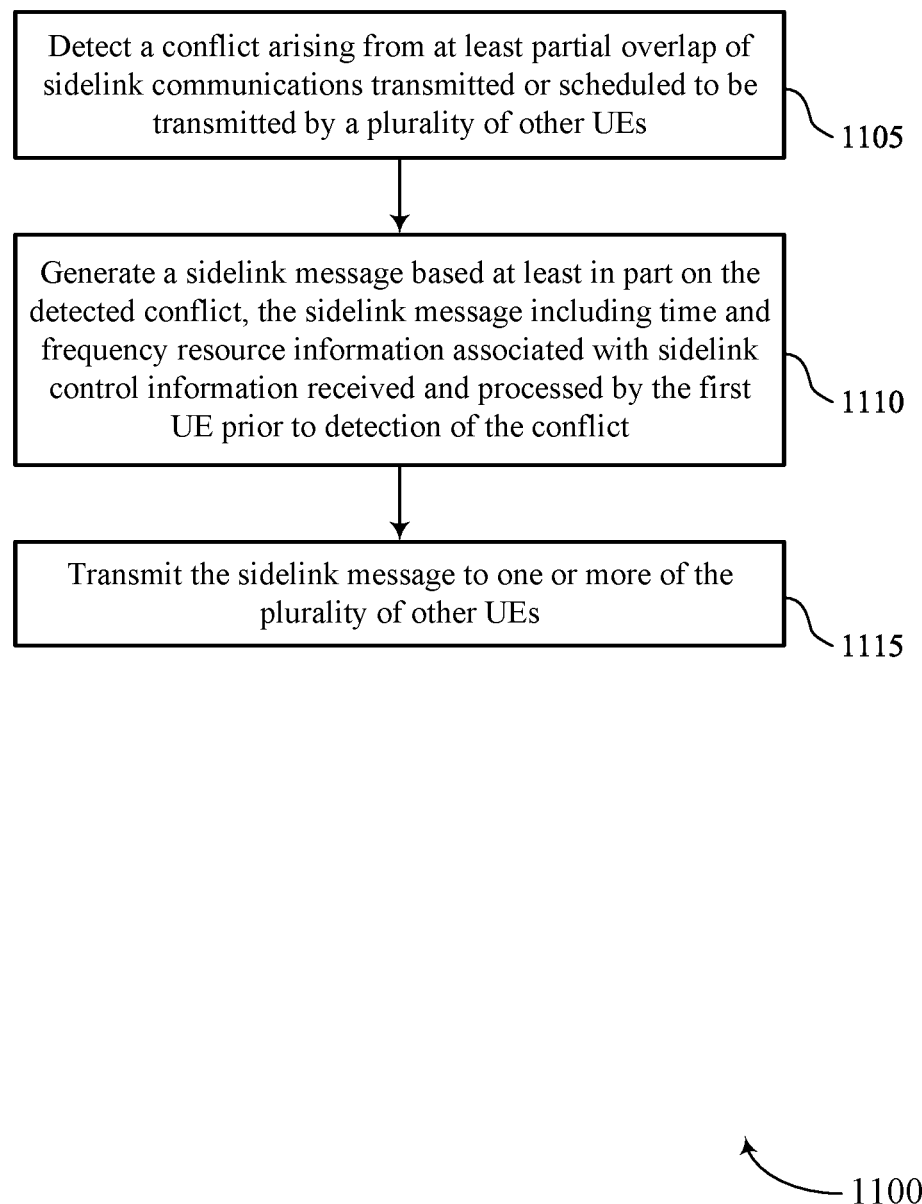

FIG. 11 shows a flowchart illustrating a method 1000 that supports techniques for sidelink resource information forwarding in accordance with aspects of the present disclosure. The operations of the method 1100 may be implemented by a UE 115 or its components as described herein. For example, the operations of the method 1100 may be performed by a UE 115 as described with reference to FIGS. 1 through 9. In some examples, a UE 115 may execute a set of instructions to control the functional elements of the UE 115 to perform the described functions. Additionally or alternatively, the UE 115 may perform aspects of the described functions using special-purpose hardware.

At 1105, the method may include detecting a conflict arising from at least partial overlap of sidelink communications transmitted or scheduled to be transmitted by a set of multiple other UEs. The operations of 1105 may be performed in accordance with examples as disclosed herein. In some examples, aspects of the operations of 1105 may be performed by a sidelink conflict manager 825 as described with reference to FIG. 8.

At 1110, the method may include generating a sidelink message based on the detected conflict, the sidelink message including time and frequency resource information associated with SCI received and processed by the first UE prior to detection of the conflict. The operations of 1110 may be performed in accordance with examples as disclosed herein. In some examples, aspects of the operations of 1110 may be performed by a sidelink message manager 830 as described with reference to FIG. 8.

At 1115, the method may include transmitting the sidelink message to one or more of the set of multiple other UEs. The operations of 1115 may be performed in accordance with examples as disclosed herein. In some examples, aspects of the operations of 1115 may be performed by a sidelink transmitting manager 835 as described with reference to FIG. 8.

Figure 12:
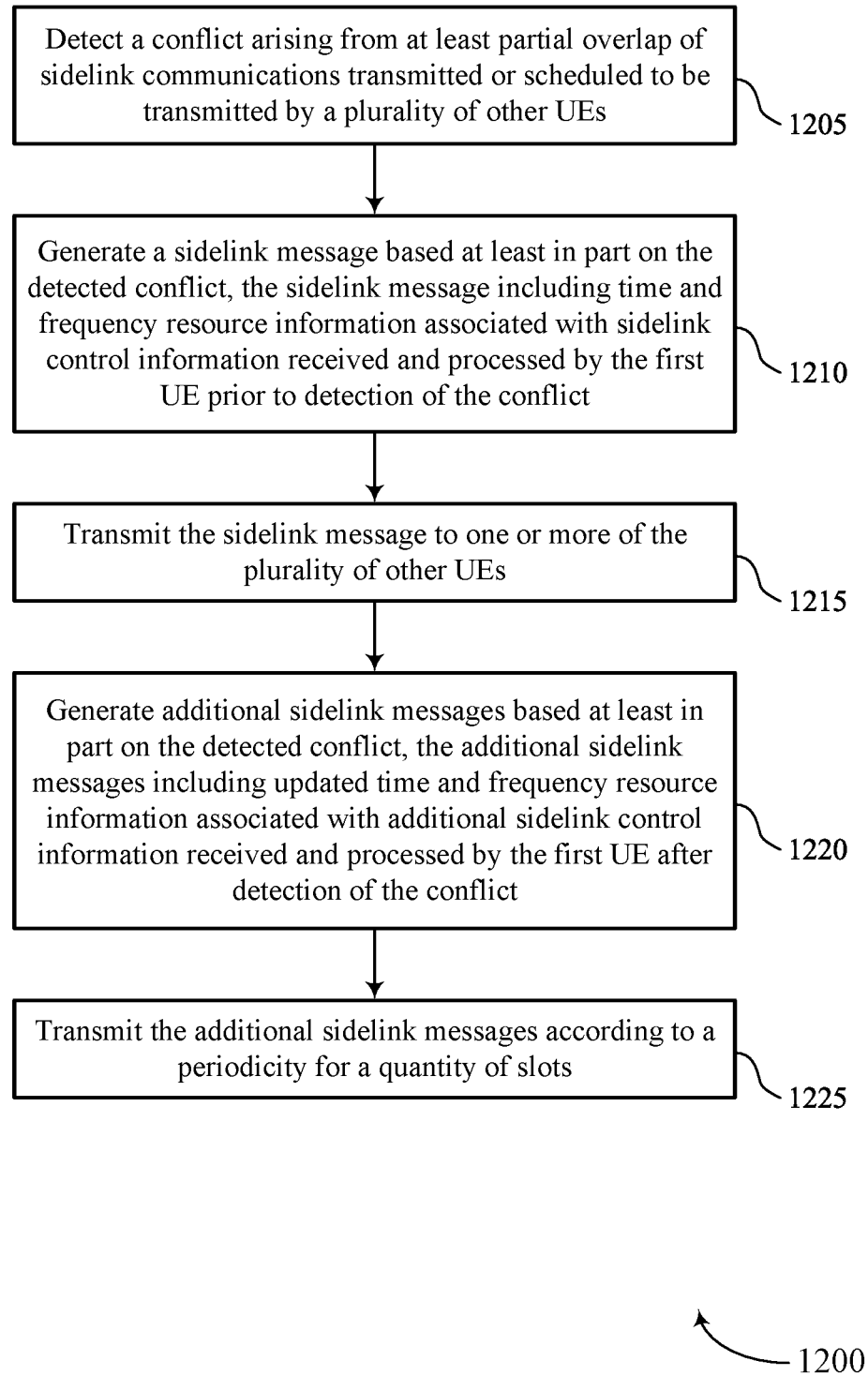

FIG. 12 shows a flowchart illustrating a method 1200 that supports techniques for sidelink resource information forwarding in accordance with aspects of the present disclosure. The operations of the method 1200 may be implemented by a UE 115 or its components as described herein. For example, the operations of the method 1200 may be performed by a UE 115 as described with reference to FIGS. 1 through 9. In some examples, a UE 115 may execute a set of instructions to control the functional elements of the UE 115 to perform the described functions. Additionally or alternatively, the UE 115 may perform aspects of the described functions using special-purpose hardware.

At 1205, the method may include detecting a conflict arising from at least partial overlap of sidelink communications transmitted or scheduled to be transmitted by a set of multiple other UEs. The operations of 1205 may be performed in accordance with examples as disclosed herein. In some examples, aspects of the operations of 1205 may be performed by a sidelink conflict manager 825 as described with reference to FIG. 8.

At 1210, the method may include generating a sidelink message based on the detected conflict, the sidelink message including time and frequency resource information associated with SCI received and processed by the first UE prior to detection of the conflict. The operations of 1210 may be performed in accordance with examples as disclosed herein. In some examples, aspects of the operations of 1210 may be performed by a sidelink message manager 830 as described with reference to FIG. 8.

At 1215, the method may include transmitting the sidelink message to one or more of the set of multiple other UEs. The operations of 1215 may be performed in accordance with examples as disclosed herein. In some examples, aspects of the operations of 1215 may be performed by a sidelink transmitting manager 835 as described with reference to FIG. 8.

At 1220, the method may include generating additional sidelink messages based on the detected conflict, the additional sidelink messages including updated time and frequency resource information associated with additional SCI received and processed by the first UE after detection of the conflict. The operations of 1220 may be performed in accordance with examples as disclosed herein. In some examples, aspects of the operations of 1220 may be performed by a sidelink message manager 830 as described with reference to FIG. 8.

At 1225, the method may include transmitting the additional sidelink messages according to a periodicity for a quantity of slots. The operations of 1225 may be performed in accordance with examples as disclosed herein. In some examples, aspects of the operations of 1225 may be performed by a sidelink transmitting manager 835 as described with reference to FIG. 8.

Figure 13:
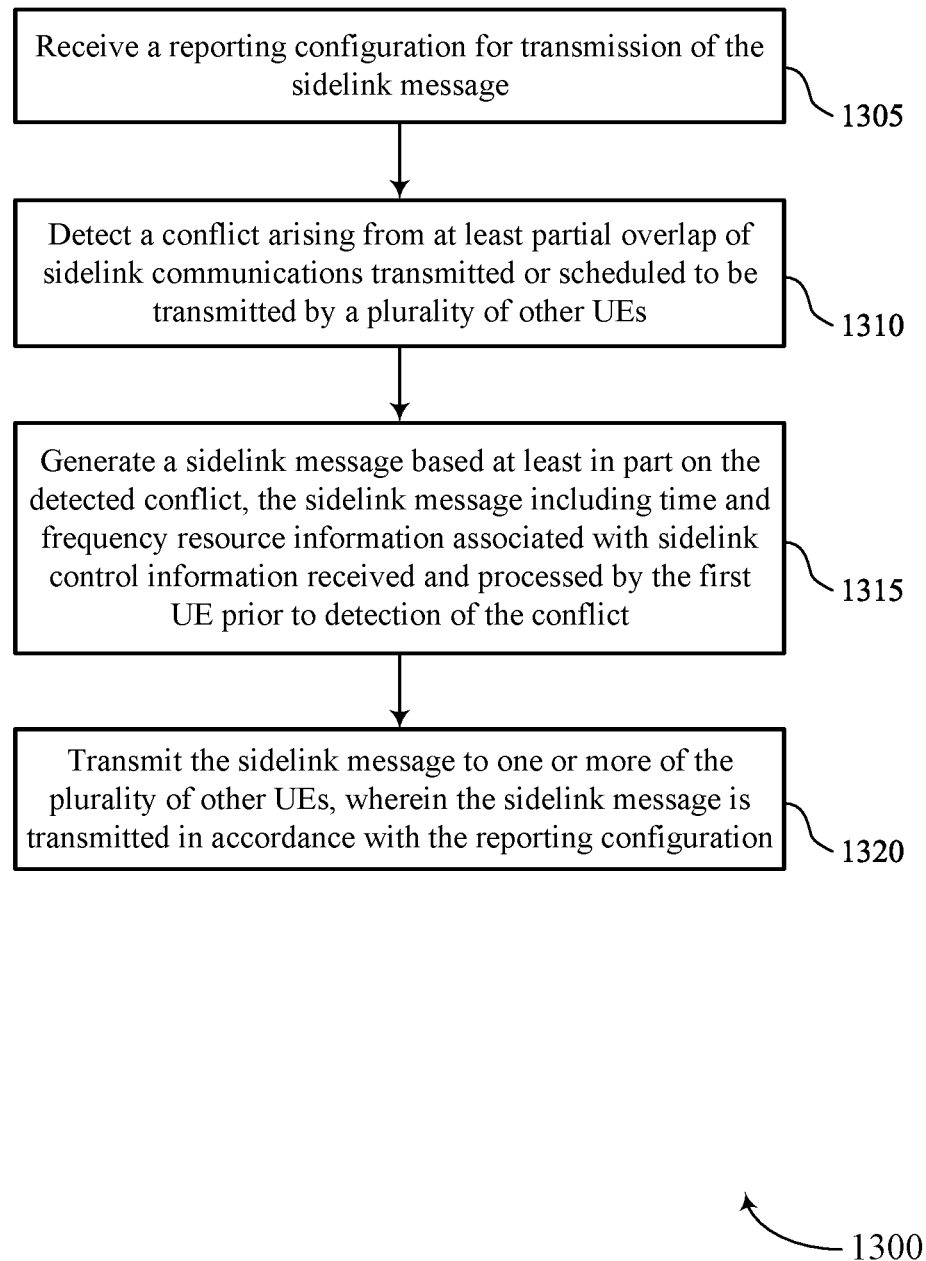

FIG. 13 shows a flowchart illustrating a method 1300 that supports techniques for sidelink resource information forwarding in accordance with aspects of the present disclosure. The operations of the method 1300 may be implemented by a UE 115 or its components as described herein. For example, the operations of the method 1300 may be performed by a UE 115 as described with reference to FIGS. 1 through 9. In some examples, a base station may execute a set of instructions to control the functional elements of the UE 115 to perform the described functions. Additionally or alternatively, the UE 115 may perform aspects of the described functions using special-purpose hardware.

At 1305, the method may include receiving a reporting configuration for transmission of the sidelink message, where the sidelink message is transmitted in accordance with the reporting configuration. The operations of 1305 may be performed in accordance with examples as disclosed herein. In some examples, aspects of the operations of 1305 may be performed by a reporting configuration manager 845 as described with reference to FIG. 8.

At 1310, the method may include detecting a conflict arising from at least partial overlap of sidelink communications transmitted or scheduled to be transmitted by a set of multiple other UEs. The operations of 1310 may be performed in accordance with examples as disclosed herein. In some examples, aspects of the operations of 1310 may be performed by a sidelink conflict manager 825 as described with reference to FIG. 8.

At 1315, the method may include generating a sidelink message based on the detected conflict, the sidelink message including time and frequency resource information associated with SCI received and processed by the first UE prior to detection of the conflict. The operations of 1315 may be performed in accordance with examples as disclosed herein. In some examples, aspects of the operations of 1315 may be performed by a sidelink message manager 830 as described with reference to FIG. 8.

At 1320, the method may include transmitting the sidelink message to one or more of the set of multiple other UEs. The operations of 1320 may be performed in accordance with examples as disclosed herein. In some examples, aspects of the operations of 1320 may be performed by a sidelink transmitting manager 835 as described with reference to FIG. 8.

The following provides an overview of aspects of the present disclosure:

Aspect 1: A method for wireless communication at a first UE, comprising: triggering a sidelink message to one or more UE of a plurality of other UEs; generating the sidelink message based at least in part on the triggering, the sidelink message including time and frequency resource information associated with sidelink control information received and processed by the first UE; multiplexing the sidelink message with a sidelink data message; and transmitting the sidelink message multiplexed with the sidelink data message to the one or more UE of the plurality of other UEs.

Aspect 2: The method of aspect 1, wherein the triggering the sidelink message comprises: detecting a conflict arising from at least partial overlap of sidelink communications transmitted or scheduled to be transmitted by the plurality of other UEs.

Aspect 3: The method of aspect 2, wherein detecting the conflict comprises: receiving at least two sidelink transmissions from the plurality of other UEs on overlapping time and frequency resources.

Aspect 4: The method of any of aspects 2 through 3, wherein detecting the conflict comprises: receiving an indication that at least two sidelink transmissions from the plurality of other UEs are scheduled to overlap in time and frequency resources.

Aspect 5: The method of any of aspects 2 through 4, wherein detecting the conflict comprises: receiving at least two sidelink transmissions from the plurality of other UEs at a same time.

Aspect 6: The method of any of aspects 1 through 5, wherein the sidelink message multiplexed with the sidelink data message is transmitted in a first slot, the method further comprising: generating additional sidelink messages based at least in part on the triggering the sidelink message, the additional sidelink messages including updated time and frequency resource information associated with additional sidelink control information received and processed by the first UE after the triggering the sidelink message; and transmitting the additional sidelink messages according to a periodicity for a quantity of slots.

Aspect 7: The method of aspect 6, wherein the periodicity is every slot during the quantity of slots.

Aspect 8: The method of any of aspects 6 through 7, further comprising: receiving an indication of the quantity of slots, the periodicity, or both, wherein the first UE transmits the additional sidelink messages based at least in part on receiving the indication of the quantity of slots, the periodicity, or both.

Aspect 9: The method of any of aspects 6 through 8, further comprising: determining the quantity of slots, the periodicity, or both, based at least in part on network congestion, wherein the first UE transmits the additional sidelink messages based at least in part on determining the quantity of slots, the periodicity, or both.

Aspect 10: The method of any of aspects 1 through 9, wherein the time and frequency resource information included in the sidelink message is based at least in part on the sidelink control information received and processed by the first UE prior to an end of a processing time interval.

Aspect 11: The method of any of aspects 1 through 10, further comprising: transmitting, via the sidelink message, an indication of the triggering the sidelink message.

Aspect 12: The method of any of aspects 1 through 11, further comprising: generating the sidelink message during a preparation time interval, wherein a start of the preparation time interval is based at least in part on the triggering the sidelink message.

Aspect 13: The method of any of aspects 1 through 12, further comprising: receiving a reporting configuration for transmission of the sidelink message, wherein the sidelink message multiplexed with the sidelink data message is transmitted in accordance with the reporting configuration.

Aspect 14: The method of any of aspects 1 through 13, wherein generating the sidelink message comprises: preparing the sidelink control information received and processed by the first UE for forwarding.

Aspect 15: The method of any of aspects 1 through 14, wherein the time and frequency resource information associated with the sidelink control information indicates a first set of sidelink resources which is available for subsequent sidelink communications, a second set of sidelink resources which is not available for subsequent sidelink communications, or both.

Aspect 16: The method of any of aspects 1 through 15, wherein the sidelink message multiplexed with the sidelink data message is transmitted via a sidelink control channel, a sidelink shared channel, a sidelink feedback channel, or any combination thereof.

Aspect 17: A method for wireless communication at a first UE, comprising: detecting a conflict arising from at least partial overlap of sidelink communications transmitted or scheduled to be transmitted by a plurality of other UEs; generating a sidelink message based at least in part on the detected conflict, the sidelink message including time and frequency resource information associated with SCI received and processed by the first UE prior to detection of the conflict; and transmitting the sidelink message to one or more of the plurality of other UEs.

Aspect 18: The method of aspect 17, wherein the sidelink message is transmitted in a first slot, the method further comprising: generating additional sidelink messages based at least in part on the detected conflict, the additional sidelink messages including updated time and frequency resource information associated with additional SCI received and processed by the first UE after detection of the conflict; and transmitting the additional sidelink messages according to a periodicity for a quantity of slots.

Aspect 19: The method of aspect 18, wherein the periodicity is every slot during the quantity of slots.

Aspect 20: The method of any of aspects 18 through 19, further comprising: receiving an indication of the quantity of slots, the periodicity, or both, wherein the first UE transmits the additional sidelink messages based at least in part on receiving the indication of the quantity of slots, the periodicity, or both.

Aspect 21: The method of any of aspects 18 through 20, further comprising: determining the quantity of slots, the periodicity, or both, based at least in part on network congestion, wherein the first UE transmits the additional sidelink messages based at least in part on determining the quantity of slots, the periodicity, or both.

Aspect 22: The method of any of aspects 17 through 21, wherein the time and frequency resource information included in the sidelink message is based at least in part on the additional SCI received and processed by the first UE prior to an end of a processing time interval.

Aspect 23: The method of any of aspects 17 through 22, further comprising: transmitting, via the sidelink message, an indication of the detected conflict.

Aspect 24: The method of any of aspects 17 through 23, further comprising: generating the sidelink message during a preparation time interval, wherein a start of the preparation time interval is based at least in part on detection of the conflict.

Aspect 25: The method of any of aspects 17 through 24, wherein detecting the conflict comprises: receiving at least two sidelink transmissions from the plurality of other UEs on overlapping time and frequency resources.

Aspect 26: The method of any of aspects 17 through 25, wherein detecting the conflict comprises: receiving an indication that at least two sidelink transmissions from the plurality of other UEs are scheduled to overlap in time and frequency resources.

Aspect 27: The method of any of aspects 17 through 26, wherein detecting the conflict comprises: receiving at least two sidelink transmissions from the plurality of other UEs at the same time.

Aspect 28: The method of any of aspects 17 through 27, further comprising: receiving a reporting configuration for transmission of the sidelink message, wherein the sidelink message is transmitted in accordance with the reporting configuration.

Aspect 29: The method of any of aspects 17 through 28, wherein generating the sidelink message, transmitting the sidelink message, or both, comprises: forwarding the SCI received and processed by the first UE.

Aspect 30: The method of any of aspects 17 through 29, wherein the time and frequency resource information associated with the SCI indicates a first set of sidelink resources which is available for subsequent sidelink communications, a second set of sidelink resources which is not available for subsequent sidelink communications, or both.

Aspect 31: The method of any of aspects 17 through 30, wherein generating the sidelink message comprises: multiplexing the time and frequency resource information with a sidelink data message, wherein transmitting the sidelink message is based at least in part on the multiplexing.

Aspect 32: The method of any of aspects 17 through 31, wherein the sidelink message is transmitted via a sidelink control channel, a sidelink shared channel, a sidelink feedback channel, or any combination thereof.

Aspect 33: An apparatus for wireless communication at a first UE, comprising a processor; memory coupled with the processor; and instructions stored in the memory and executable by the processor to cause the apparatus to perform a method of any of aspects 1 through 16.

Aspect 34: An apparatus for wireless communication at a first UE, comprising a processor; memory coupled with the processor; and instructions stored in the memory and executable by the processor to cause the apparatus to perform a method of any of aspects 17 through 32.

Aspect 35: An apparatus for wireless communication at a first UE, comprising at least one means for performing a method of any of aspects 1 through 16.

Aspect 36: An apparatus for wireless communication at a first UE, comprising at least one means for performing a method of any of aspects 17 through 32.

Aspect 37: A non-transitory computer-readable medium storing code for wireless communication at a first UE, the code comprising instructions executable by a processor to perform a method of any of aspects 1 through 16.

Aspect 38: A non-transitory computer-readable medium storing code for wireless communication at a first UE, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    triggering a sidelink coordination message to a second UE;
    generating the sidelink coordination message for the second UE based at least in part on the triggering, the sidelink coordination message indicating time and frequency resources for transmission by the second UE, the time and frequency resources associated with sidelink control information received from at least the second UE and processed by the first UE;
    multiplexing the sidelink coordination message with a first sidelink data message; and
    transmitting the sidelink coordination message multiplexed with the first sidelink data message to the second UE, wherein the sidelink coordination message multiplexed with the first sidelink data message is transmitted in accordance with a received reporting configuration that indicates a set of one or more parameters for transmission of sidelink coordination messages that indicate time and frequency resource information for second sidelink data messages by the second UE.

2. The method of claim 1, wherein triggering the sidelink coordination message comprises:
    detecting a conflict arising from at least partial overlap of sidelink communications transmitted or scheduled to be transmitted by a plurality of other UEs comprising at least the second UE.

3. The method of claim 2, wherein detecting the conflict comprises:
    receiving at least two sidelink transmissions from the plurality of other UEs on overlapping time and frequency resources.

4. The method of claim 2, wherein detecting the conflict comprises:
    receiving an indication that at least two sidelink transmissions from the plurality of other UEs are scheduled to overlap in time and frequency resources.

5. The method of claim 2, wherein detecting the conflict comprises:
    receiving at least two sidelink transmissions from the plurality of other UEs at a same time.

6. The method of claim 1, wherein the sidelink coordination message multiplexed with the first sidelink data message is transmitted in a first slot, the method further comprising:
    generating additional sidelink coordination messages based at least in part on the triggering, the additional sidelink coordination messages including updated time and frequency resource information associated with additional sidelink control information received and processed by the first UE after generating the sidelink coordination message; and
    transmitting the additional sidelink coordination messages according to a periodicity for a quantity of slots.

7. The method of claim 6, wherein the periodicity is every slot during the quantity of slots.

8. The method of claim 6, further comprising:
    receiving an indication of the quantity of slots, the periodicity, or both, wherein the first UE transmits the additional sidelink coordination messages based at least in part on receiving the indication of the quantity of slots, the periodicity, or both.

9. The method of claim 6, further comprising:
    determining the quantity of slots, the periodicity, or both, based at least in part on network congestion, wherein the first UE transmits the additional sidelink coordination messages based at least in part on determining the quantity of slots, the periodicity, or both.

10. The method of claim 1, wherein the sidelink control information is received and processed by the first UE prior to an end of a processing time interval.

11. The method of claim 1, further comprising:
    transmitting, via the sidelink coordination message, an indication of the sidelink coordination message.

12. The method of claim 1, further comprising:
    generating the sidelink coordination message during a preparation time interval, wherein a start of the preparation time interval is based at least in part on the triggering.

13. The method of claim 1, further comprising:
    receiving the reporting configuration for transmission of the sidelink coordination message.

14. The method of claim 1, wherein generating the sidelink coordination message comprises:
    preparing the sidelink control information received and processed by the first UE for forwarding.

15. The method of claim 1, wherein the time and frequency resources comprise a first set of sidelink resources which is available for subsequent sidelink communications, a second set of sidelink resources which is not available for subsequent sidelink communications, or both.

16. The method of claim 1, wherein the sidelink coordination message multiplexed with the first sidelink data message is transmitted via a sidelink control channel, a sidelink shared channel, a sidelink feedback channel, or any combination thereof.

17. An apparatus for wireless communication at a first user equipment (UE), comprising:
one or more memories storing processor-executable instructions; and
one or more processors coupled with the one or more memories and individually or collectively operable to execute the instructions to cause the apparatus to:
trigger a sidelink coordination message to a second UE;
generate the sidelink coordination message for the second UE based at least in part on the triggering, the sidelink coordination message indicating time and frequency resources for transmission by the second UE, the time and frequency resources associated with sidelink control information received from at least the second UE and processed by the first UE;
multiplex the sidelink coordination message with a first sidelink data message; and
transmit the sidelink coordination message multiplexed with the first sidelink data message to the second UE, wherein the sidelink coordination message multiplexed with the first sidelink data message is transmitted in accordance with a received reporting configuration that indicates a set of one or more parameters for transmission of sidelink coordination messages that indicate time and frequency resource information for second sidelink data messages by the second UE.

18. The apparatus of claim 17, wherein the instructions to trigger the sidelink coordination message are executable by the one or more processors to cause the apparatus to:
detect a conflict arising from at least partial overlap of sidelink communications transmitted or scheduled to be transmitted by a plurality of other UEs comprising at least the second UE.

19. The apparatus of claim 18, wherein the instructions to detect the conflict are executable by the one or more processors to cause the apparatus to:
receive at least two sidelink transmissions from the plurality of other UEs on overlapping time and frequency resources.

20. The apparatus of claim 18, wherein the instructions to detect the conflict are executable by the one or more processors to cause the apparatus to:
receive an indication that at least two sidelink transmissions from the plurality of other UEs are scheduled to overlap in time and frequency resources.

21. The apparatus of claim 18, wherein the instructions to detect the conflict are executable by the one or more processors to cause the apparatus to:
receive at least two sidelink transmissions from the plurality of other UEs at a same time.

22. The apparatus of claim 17, wherein the sidelink coordination message multiplexed with the first sidelink data message is transmitted in a first slot, and wherein the instructions are further executable by the one or more processors to cause the apparatus to:
generate additional sidelink coordination messages based at least in part on the triggering, the additional sidelink coordination messages including updated time and frequency resource information associated with additional sidelink control information received and processed by the first UE after generating the sidelink coordination message; and
transmit the additional sidelink coordination messages according to a periodicity for a quantity of slots.

23. The apparatus of claim 22, wherein the instructions are further executable by the one or more processors to cause the apparatus to:
receive an indication of the quantity of slots, the periodicity, or both, wherein the first UE transmits the additional sidelink coordination messages based at least in part on receiving the indication of the quantity of slots, the periodicity, or both.

24. The apparatus of claim 17, wherein the instructions are further executable by the one or more processors to cause the apparatus to:
transmit, via the sidelink coordination message, an indication of the sidelink coordination message.

25. The apparatus of claim 17, wherein the instructions are further executable by the one or more processors to cause the apparatus to:
generate the sidelink coordination message during a preparation time interval, wherein a start of the preparation time interval is based at least in part on the triggering.

26. The apparatus of claim 17, wherein the instructions are further executable by the one or more processors to cause the apparatus to:
receive the reporting configuration for transmission of the sidelink coordination message.

27. The apparatus of claim 17, wherein the instructions to generate the sidelink coordination message are executable by the one or more processors to cause the apparatus to:
prepare the sidelink control information received and processed by the first UE for forwarding.

28. The apparatus of claim 17, wherein the sidelink coordination message multiplexed with the first sidelink data message is transmitted via a sidelink control channel, a sidelink shared channel, a sidelink feedback channel, or any combination thereof.

29. An apparatus for wireless communication at a first user equipment (UE), comprising:
means for triggering a sidelink coordination message to a second UE;
means for generating the sidelink coordination message for the second UE based at least in part on the triggering, the sidelink coordination message indicating time and frequency resources for transmission by the second UE, the time and frequency resources associated with sidelink control information received from at least the second UE and processed by the first UE;
means for multiplexing the sidelink coordination message with a first sidelink data message; and
means for transmitting the sidelink coordination message multiplexed with the first sidelink data message to the second UE, wherein the sidelink coordination message multiplexed with the first sidelink data message is transmitted in accordance with a received reporting configuration that indicates a set of one or more parameters for transmission of sidelink coordination messages that indicate time and frequency resource information for second sidelink data messages by the second UE.

30. A non-transitory computer-readable medium storing code for wireless communication at a first user equipment (UE), the code comprising instructions executable by one or more processors to:
trigger a sidelink coordination message to a second UE;
generate the sidelink coordination message for the second UE based at least in part on the triggering, the sidelink coordination message indicating time and frequency resources for transmission by the second UE, the time and frequency resources associated with sidelink control information received from at least the second UE and processed by the first UE;

multiplex the sidelink coordination message with a first sidelink data message; and transmit the sidelink coordination message multiplexed with the first sidelink data message to the second UE, wherein the sidelink coordination message multiplexed with the first sidelink data message is transmitted in accordance with a received reporting configuration that indicates a set of one or more parameters for transmission of sidelink coordination messages that indicate time and frequency resource information for second sidelink data messages by the second UE.

* * * * *